(12) United States Patent
Bhattad et al.

(10) Patent No.: US 10,917,219 B2
(45) Date of Patent: Feb. 9, 2021

(54) MULTIPLEXING CODE BLOCK GROUP LEVEL AND TRANSPORT BLOCK LEVEL FEEDBACK

(71) Applicant: QUALCOMM Incorporated, San Diego, CA (US)

(72) Inventors: Kapil Bhattad, Bangalore (IN); Xiaoxia Zhang, San Diego, CA (US); Jing Sun, San Diego, CA (US); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 16/107,258

(22) Filed: Aug. 21, 2018

(65) Prior Publication Data

US 2019/0074952 A1 Mar. 7, 2019

Related U.S. Application Data

(60) Provisional application No. 62/554,705, filed on Sep. 6, 2017.

(51) Int. Cl.
*H04L 5/00* (2006.01)
*H04L 1/18* (2006.01)
*H04L 1/16* (2006.01)

(52) U.S. Cl.
CPC .......... *H04L 5/0055* (2013.01); *H04L 1/1614* (2013.01); *H04L 1/1812* (2013.01); *H04L 1/1822* (2013.01); *H04L 1/1861* (2013.01); *H04L 5/0046* (2013.01)

(58) Field of Classification Search
CPC ... H04L 5/0055; H04L 1/1861; H04L 1/1614; H04L 1/1822; H04L 5/0046; H04L 1/1812
See application file for complete search history.

(56) References Cited

U.S. PATENT DOCUMENTS

| | | | |
|---|---|---|---|
| 2018/0278368 A1* | 9/2018 | Kim | H04L 1/0048 |
| 2018/0324816 A1* | 11/2018 | Islam | H04W 72/085 |
| 2019/0150181 A1* | 5/2019 | Kim | H04L 1/1858 370/329 |

(Continued)

OTHER PUBLICATIONS

Sequans, CBG based HARQ-Ack/Nackuans, TSG RAN WG1 Meeting #90, Prague, P.R. Czechia Aug. 21-25, 2017, R1-1713299. (Year: 2017).*

(Continued)

*Primary Examiner* — Shailendra Kumar
(74) *Attorney, Agent, or Firm* — Holland & Hart LLP

(57) ABSTRACT

Methods, systems, and devices for multiplexing code block group (CBG) level and transport block (TB) level feedback are described. An example method includes receiving a set of TBs, generating a bit sequence providing CBG-level feedback on a first subset of the TBs and TB-level feedback on at least a second subset of the TBs, and transmitting the bit sequence. Another example method includes transmitting a set of TBs, receiving a bit sequence providing CBG-level feedback on a first subset of the TBs and TB-level feedback on at least a second subset of the TBs, and retransmitting at least one CBG for each TB in the first subset of TBs and the second subset of TBs based at least in part on the bit sequence.

22 Claims, 22 Drawing Sheets

(56) References Cited

U.S. PATENT DOCUMENTS

| | | | | |
|---|---|---|---|---|
| 2019/0342053 | A1* | 11/2019 | Peng | H04L 5/0053 |
| 2020/0028627 | A1* | 1/2020 | Andersson | H04L 1/1864 |
| 2020/0036482 | A1* | 1/2020 | Park | H04L 1/1621 |

OTHER PUBLICATIONS

NTT Docomo, Inc, HARQ-ACK multiplexing, 3GPP TSG RAN WG1 Meeting #90, Prague, P.R. Czechia Aug. 21-25, 2017, R1-1713957. (Year: 2017).*

Sequans, CBG based retransmission, 3GPP TSG RAN WG1 Meeting #90, Prague, P.R. Czechia Aug. 21th-25th, 2017, R1-1713300. (Year: 2017).*

International Search Report and Written Opinion—PCT/US2018/047492—ISA/EPO—dated Oct. 16, 2018.

Sequans: "CBG based HARQ-Ack/Nack", 3GPP Draft; R1-1713299—CBG Based HARQ, 3rd Generation Partnership Project (3GPP), Mobile Competence Centre; 650, Route Des Lucioles; F-06921 Sophia-Antipolis Cedex; France, vol. RAN WG1, No. Prague, P.R. Czechia; Aug. 21, 2017-Aug. 25, 2017 Aug. 20, 2017, XP051316106, Retrieved from the Internet: URL:http://www.3gpp.org/ftp/Meetings_3GPP_SYNC/RAN1/Docs/ [retrieved on Aug. 20, 2017], 5 pages.

AT&T: "On the details of uplink Control Channel Design for CBG based Transmission Schemes", 3GPP Draft; R1-1712723 On the details of uplink Control Channel Design for CBG based Transmission Schemes, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017, XP051315536, Retrieved from the Internet: URL:http://www.3gpp.org/ftp/Meetings_3GPP_SYNC/RAN1/Docs/ [retrieved on Aug. 20, 2017], 6 pages.

Huawei et al., "Discussion on CBG-based Feedback", 3GPP Draft; R1-1712202, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017, XP051315019, Retrieved from the Internet: URL:http://www.3gpp.org/ftp/Meetings_3GPP_SYNC/RAN1/Docs/ [retrieved on Aug. 20, 2017], 4 pages.

NTT Docomo et al., "HARQ-ACK Multiplexing", 3GPP Draft; R1-1713957, 3rd Generation Partnership Project (3GPP), Mobile Competence Centre; 650, Route Des Lucioles; F-06921 Sophia-Antipolis Cedex; France, vol. RAN WG1, No. Prague, P.R. Czechia; Aug. 21, 2017-Aug. 25, 2017 Aug. 20, 2017, XP051316749, Retrieved from the Internet: URL:http://www.3gpp.org/ftp/Meetings_3GPP_SYNC/RAN1/Docs/ [retrieved on Aug. 20, 2017], 4 pages.

ZTE: "UL control for CBG", 3GPP Draft; R1-1712667 UL control for CBG, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017, XP051315480, Retrieved from the Internet: URL:http://www.3gpp.org/ftp/Meetings_3GPP_SYNC/RAN1/Docs/ [retrieved on Aug. 20, 2017], 6 pages.

* cited by examiner

TB-level ACK

TB-level NACK

CBG-level ACK

CBG-level NACK

TB-level ACK

TB-level NACK

CBG-level ACK

CBG-level NACK

| | Predetermined Mapping of CBG-level Feedback when selecting two TBs out of 4 NACK'd TBs |
|---|---|
| 000 | First and Second NACK'd TB |
| 001 | First and Third NACK'd TB |
| 010 | First and Fourth NACK'd TB |
| 100 | Second and Third NACK'd TB |
| 101 | Second and Fourth NACK'd TB |
| 110 | Third and Fourth NACK'd TB |

MULTIPLEXING CODE BLOCK GROUP LEVEL AND TRANSPORT BLOCK LEVEL FEEDBACK

CROSS REFERENCES

The present Application for Patent claims the benefit of U.S. Provisional Patent Application No. 62/554,705 by BHATTAD et al., entitled "MULTIPLEXING CODE BLOCK GROUP LEVEL AND TRANSPORT BLOCK LEVEL FEEDBACK," filed Sep. 6, 2017, assigned to the assignee hereof, and expressly incorporated herein.

BACKGROUND

The following relates generally to wireless communication, and more specifically to multiplexing code block group level and transport block level feedback.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, data may be transmitted to a target device according to a transport block (TB) arrangement, where a transport block may include a plurality of code blocks (CBs). The target device for the data transmission may transmit acknowledgment (ACK) feedback for each TB that is successfully received, and negative-acknowledgment (NACK) feedback for each TB that is not successfully received. However, transmitting such TB-level acknowledgements may waste transmission resources when some of the CBs of a particular TB are received successfully and some of the CBs of the particular TB are not received successfully, and the target device transmits NACK feedback for the entire TB.

SUMMARY

The described techniques relate to improved methods, systems, devices, and apparatuses that support multiplexing code block group (CBG) level and TB-level feedback (e.g., ACK/NACK feedback). According to one or more aspects of the present disclosure, a first device may transmit a data transmission to a second device according to a TB arrangement (e.g., a set of TBs), where each TB may be associated with a unique hybrid automatic repeat request (HARQ) identifier (ID) for coordinating transmission and retransmission operations. Each transmitted TB may include one or more CBGs, and each CBG may include at least one code block (CB). The second device may receive all of the data transmission, none of the data transmission, or some portion of the transmission, and in response the second device may provide feedback to the first device that includes TB-level feedback (e.g., TB-level ACK/NACK) for a portion of the data transmission (e.g., a first portion of the set of TBs), and CBG-level feedback (e.g., CBG-level ACK/NACK) for a portion of the transmitted data (e.g., a second portion of the set of TBs).

By multiplexing CBG-level and TB-level feedback in accordance with aspects of the present disclosure, a wireless communications system can support more efficient communications resource utilization than TB-level feedback alone by reducing redundant retransmissions of CBG-level data (e.g., a redundant retransmission of a CBG that was received successfully, but accompanied a CBG of the same TB that was not received successfully), while also utilizing fewer communications resources than when supporting CBG-level feedback alone. In some examples, a feedback signaling arrangement may be selected in order to balance the utilization of TB-level feedback and CBG-level feedback, and the signaling required for the particular feedback signaling arrangement, in the context of available communications resources and various network conditions.

A method of wireless communication is described. The method may include receiving a set of TBs, each of the TBs comprising one or more CBGs, generating a bit sequence providing CBG-level feedback on a first subset of TBs in the set of TBs and TB-level feedback on at least a second subset of TBs in the set of TBs, the first subset differing from the second subset, and transmitting the bit sequence.

An apparatus for wireless communication is described. The apparatus may include means for receiving a set of TBs, each of the TBs comprising one or more CBGs, means for generating a bit sequence providing CBG-level feedback on a first subset of TBs in the set of TBs and TB-level feedback on at least a second subset of TBs in the set of TBs, the first subset differing from the second subset, and means for transmitting the bit sequence.

Another apparatus for wireless communication is described. The apparatus may include a processor, memory in electronic communication with the processor, and instructions stored in the memory. The instructions may be executable by the processor to receive a set of TBs, each of the TBs comprising one or more CBGs, generate a bit sequence providing CBG-level feedback on a first subset of TBs in the set of TBs and TB-level feedback on at least a second subset of TBs in the set of TBs, the first subset differing from the second subset, and transmit the bit sequence.

A non-transitory computer readable medium for wireless communication is described. The non-transitory computer-readable medium may include instructions executable by a processor to receive a set of TBs, each of the TBs comprising one or more CBGs, generate a bit sequence providing CBG-level feedback on a first subset of TBs in the set of TBs and TB-level feedback on at least a second subset of TBs in the set of TBs, the first subset differing from the second subset, and transmit the bit sequence.

In some examples of the method, apparatus, and non-transitory computer-readable medium, generating the bit sequence includes generating the bit sequence to include a first subsequence that provides the TB-level feedback on each TB in the set of TBs and a second subsequence that provides the CBG-level feedback on the first subset of TBs. In some examples, generating the bit sequence includes generating a value for a parity check bit in the bit sequence based at least in part on the first subsequence, or the second subsequence, or both.

In some examples of the method, apparatus, and non-transitory computer-readable medium, a number of TBs in the first subset of TBs corresponds to a defined number of resources allocated for the CBG-level feedback.

In some examples of the method, apparatus, and non-transitory computer-readable medium, the set of TBs may be in an order, and the first subset of TBs includes a defined number of TBs in the set of TBs at a beginning of the order, or the defined number of TBs in the set of TBs at an ending of the order, or the defined number of TBs in the set of TBs after skipping a second defined number of TBs in the order that were not successfully received.

In some examples of the method, apparatus, and non-transitory computer-readable medium, if a number of unsuccessfully received TBs in the set of TBs is below a threshold, at least a portion of the bit sequence may be set to a predetermined sequence or a parity sequence.

In some examples of the method, apparatus, and non-transitory computer-readable medium, the TB-level feedback may be associated with a set of feedback processes each having a feedback identifier associated with a respective TB in the set of TBs.

In some examples of the method, apparatus, and non-transitory computer-readable medium, generating the bit sequence includes generating the bit sequence to include a first subsequence that provides the TB-level feedback on each TB in the set of TBs and a bit map in the bit sequence that identifies the first subset of TBs.

In some examples of the method, apparatus, and non-transitory computer-readable medium, generating the bit sequence includes generating the bit sequence to include a first subsequence that provides the TB-level feedback on each TB in the set of TBs and an index in the bit sequence that identifies the first subset of TBs. In some examples, the index may have a fixed bit width.

In some examples of the method, apparatus, and non-transitory computer-readable medium, generating the bit sequence includes generating a bit map in the bit sequence to indicate that the first subset of TBs includes the CBG-level feedback and that the second subset of TBs includes the TB-level feedback.

In some examples of the method, apparatus, and non-transitory computer-readable medium, generating the bit sequence includes generating, in accordance with the bit map, a subsequence in the bit sequence to provide the CBG-level feedback for the first subset of TBs and the TB-level feedback for the second subset of TBs.

In some examples of the method, apparatus, and non-transitory computer-readable medium, generating the bit sequence includes generating a value for each two bits in a first subsequence of the bit sequence indicating whether a respective TB in the set of TBs was successfully received, or whether a control channel was successfully received, or whether the CBG-level feedback may be being provided for the respective TB. In some examples, generating the bit sequence includes generating a second subsequence of the bit sequence that provides the CBG-level feedback for the first subset of TBs in accordance with the indication of the first subsequence of whether the CBG-level feedback may be being provided for the respective TB.

In some examples of the method, apparatus, and non-transitory computer-readable medium, generating the bit sequence includes selecting to provide the CBG-level feedback on the first subset of TBs based at least in part on a number of available bits in the bit sequence and a number of TBs in the set of TBs that were not successfully received, and the method, apparatus, or non-transitory computer-readable medium may further include operations, features, means, or instructions for generating the bit sequence to include a first subsequence that provides the TB-level feedback on each TB in the set of TBs, a second subsequence that identifies the first subset of TBs on which the bit sequence includes the CBG-level feedback, and a third subsequence that includes the CBG-level feedback on the first subset of TBs. Some examples of the method, apparatus, and non-transitory computer-readable medium may further include operations, features, means, or instructions for selecting a format for the second subsequence based at least in part on one or more of a number of bits in the bit sequence, or a number of TBs in the set of TBs, or a number of TBs in the set of TBs that were not successfully received, or a CBG size, or a combination thereof.

Some examples of the method, apparatus, and non-transitory computer-readable medium may further include operations, features, means, or instructions for receiving control information indicating to provide the CBG-level feedback on the first subset of TBs and the TB-level feedback on the second subset of TBs. In some examples, the control information specifies an offset within a feedback resource for at least one of the TB-level feedback or the CBG-level feedback. In some examples, the control information specifies a number of feedback resources to use for a feedback process, or a set of grants corresponding to a set of feedback processes, or a number of feedback processes and a feedback identifier corresponding to each feedback process, or a start location and number of bits, or a number of bits for CBG-level feedback for a particular feedback process of a plurality of feedback processes, or any combination thereof.

Some examples of the method, apparatus, and non-transitory computer-readable medium may further include operations, features, means, or instructions for selecting to send the CBG-level feedback on a first TB in the first subset of TBs based at least in part on a number of CBGs of the first TB that pass error detection relative to a number of CBGs of a second TB that pass error detection.

Some examples of the method, apparatus, and non-transitory computer-readable medium may further include operations, features, means, or instructions for selecting to send the CBG-level feedback on a first TB in the first subset of second TBs based at least in part on a ratio of CBGs of the first TB that pass error detection relative to a ratio of CBGs of a second TB that pass error detection.

In some examples of the method, apparatus, and non-transitory computer-readable medium, generating the bit sequence includes receiving control information specifying a number of bits to include in the bit sequence, and the method, apparatus, or non-transitory computer-readable medium may further include operations, features, means, or instructions for selecting to send the CBG-level feedback on a first TB in the first subset of TBs based at least in part on a ratio of CBGs of the first TB that pass error detection relative to a ratio of CBGs of a second TB that pass error detection, and on the number of bits.

Some examples of the method, apparatus, and non-transitory computer-readable medium may further include operations, features, means, or instructions for determining that a number of CBGs exceeds an amount of available feedback resources, determining a bundling size as a function of the number of CBGs that does not exceed the amount of available feedback resources, and dividing the number of CBGs into bundles of the determined bundling size, and the CBG-level feedback may be generated based at least in part on CBs in a respective one of the bundles.

Some examples of the method, apparatus, and non-transitory computer-readable medium may further include operations, features, means, or instructions for determining that a number of CBGs exceeds an amount of available feedback resources, determining a first bundling size as a function of the number of CBGs that does not exceed the amount of available feedback resources, determining a second bundling size as a function of the first bundling size, and dividing a first subset of the number of CBGs into a first set of bundles of the first bundling size and a second subset of the number of CBGs into a second set of bundles of the second bundling size, and the CBG-level feedback may be generated based at least in part on CBs in a respective one of the first set of bundles of the second set of bundles.

In some examples of the method, apparatus, and non-transitory computer-readable medium, a CBG may have a fixed size, and a number of bits in the bit sequence may be a function of a number of scheduled CBGs.

In some examples of the method, apparatus, and non-transitory computer-readable medium, a CBG includes at least one code block.

A method of wireless communication is described. The method may include transmitting a set of TBs, each of the TBs comprising one or more CBGs, receiving a bit sequence providing CBG-level feedback on a first subset of TBs in the set of TBs and TB-level feedback on at least a second subset of TBs in the set of TBs, the first subset differing from the second subset, and retransmitting at least one CBG for each TB in the first subset of TBs and the second subset of TBs based at least in part on the bit sequence.

An apparatus for wireless communication is described. The apparatus may include means for transmitting a set of TBs, each of the TBs comprising one or more CBGs, means for receiving a bit sequence providing CBG-level feedback on a first subset of TBs in the set of TBs and TB-level feedback on at least a second subset of TBs in the set of TBs, the first subset differing from the second subset, and means for retransmitting at least one CBG for each TB in the first subset of TBs and the second subset of TBs based at least in part on the bit sequence.

Another apparatus for wireless communication is described. The apparatus may include a processor, memory in electronic communication with the processor, and instructions stored in the memory. The instructions may be operable to cause the processor to transmit a set of TBs, each of the TBs comprising one or more CBGs, receive a bit sequence providing CBG-level feedback on a first subset of TBs in the set of TBs and TB-level feedback on at least a second subset of TBs in the set of TBs, the first subset differing from the second subset, and retransmit at least one CBG for each TB in the first subset of TBs and the second subset of TBs based at least in part on the bit sequence.

A non-transitory computer readable medium for wireless communication is described. The non-transitory computer-readable medium may include instructions operable to cause a processor to transmit a set of TBs, each of the TBs comprising one or more CBGs, receive a bit sequence providing CBG-level feedback on a first subset of TBs in the set of TBs and TB-level feedback on at least a second subset of TBs in the set of TBs, the first subset differing from the second subset, and retransmit at least one CBG for each TB in the first subset of TBs and the second subset of TBs based at least in part on the bit sequence.

Some examples of the method, apparatus, and non-transitory computer-readable medium may further include operations, features, means, or instructions for processing the bit sequence to identify a first subsequence that provides the TB-level feedback on each TB in the set of TBs and a second subsequence that provides the CBG-level feedback on the first subset of TBs. Some examples may further include operations, features, means, or instructions for generating an error detection decision based at least in part on processing a value for a parity check bit in the bit sequence that is based at least in part on the first subsequence, or the second subsequence, or both.

In some examples of the method, apparatus, and non-transitory computer-readable medium, a number of TBs in the first subset of TBs corresponds to a defined number of resources allocated for the CBG-level feedback. In some examples, the set of TBs may be in an order, and the first subset of TBs includes a defined number of TBs in the set of TBs at a beginning of the order, the defined number of TBs in the set of TBs at an ending of the order, or the defined number of TBs in the set of TBs after skipping a second defined number of TBs in the order that were not successfully received.

In some examples of the method, apparatus, and non-transitory computer-readable medium, if a number of unsuccessfully received TBs in the set of TBs is below a threshold, the method, apparatus, or non-transitory computer-readable medium may include operations, features, means, or instructions for processing the bit sequence to identify a predetermined sequence or to identify a parity sequence.

In some examples of the method, apparatus, and non-transitory computer-readable medium, the TB-level feedback may be associated with a set of feedback processes each having a feedback identifier associated with a respective TB in the set of TBs.

Some examples of the method, apparatus, and non-transitory computer-readable medium may further include operations, features, means, or instructions for processing the bit sequence to identify a first subsequence that provides the TB-level feedback on each TB in the set of TBs, and a bit map in the bit sequence that identifies the first subset of TBs.

Some examples of the method, apparatus, and non-transitory computer-readable medium may further include operations, features, means, or instructions for processing the bit sequence to identify a first subsequence that provides the TB-level feedback on each TB in the set of TBs and an index in the bit sequence that identifies the first subset of TBs. In some examples, the index may have a fixed bit width.

Some examples of the method, apparatus, and non-transitory computer-readable medium may further include operations, features, means, or instructions for processing a bit map in the bit sequence to identify that the first subset of TBs includes the CBG-level feedback and that the second subset of TBs includes the TB-level feedback. Some examples may further include operations, features, means, or instructions for processing, based at least in part on the bit map, a subsequence in the bit sequence to identify the CBG-level feedback for the first subset of TBs and the TB-level feedback for the second subset of TBs.

Some examples of the method, apparatus, and non-transitory computer-readable medium may further include operations, features, means, or instructions for processing a value for each two bits in a first subsequence of the bit sequence identifying whether a respective TB in the set of TBs was successfully received, or whether a control channel was successfully received, or whether CBG-level feedback may be being provided for the respective TB. Some examples may further include operations, features, means, or instructions for processing a second subsequence of the bit sequence to identify the CBG-level feedback for the first subset of TBs in accordance with the indication of the first subsequence of whether the CBG-level feedback may be being provided for the respective TB.

Some examples of the method, apparatus, and non-transitory computer-readable medium may further include operations, features, means, or instructions for processing the bit sequence to identify a first subsequence that provides the TB-level feedback on each TB in the set of TBs, a second subsequence that identifies the first subset of TBs on which the bit sequence includes the CBG-level feedback, and a third subsequence that provides the CBG-level feedback on the first subset of TBs. Some examples may further include operations, features, means, or instructions for determining a format for the second subsequence based at least in part on one or more of a number of bits in the bit sequence, or a number of TBs in the set of TBs, or a number of TBs in the set of TBs that were not successfully received, or a CBG size, or any combination thereof.

Some examples of the method, apparatus, and non-transitory computer-readable medium may further include operations, features, means, or instructions for transmitting control information indicating to provide the CBG-level feedback on the first subset of TBs and the TB-level feedback on the second subset of TBs. In some examples the control information may specify an offset within a feedback resource for at least one of the TB-level feedback or the CBG-level feedback, or a number of feedback resources to use for a feedback process, or a number of bits for CBG-level feedback for a particular feedback process of a plurality of feedback processes, or a combination thereof In some examples of the method, apparatus, and non-transitory computer-readable medium, a CBG includes at least one code block.

DETAILED DESCRIPTION

Figure 1:
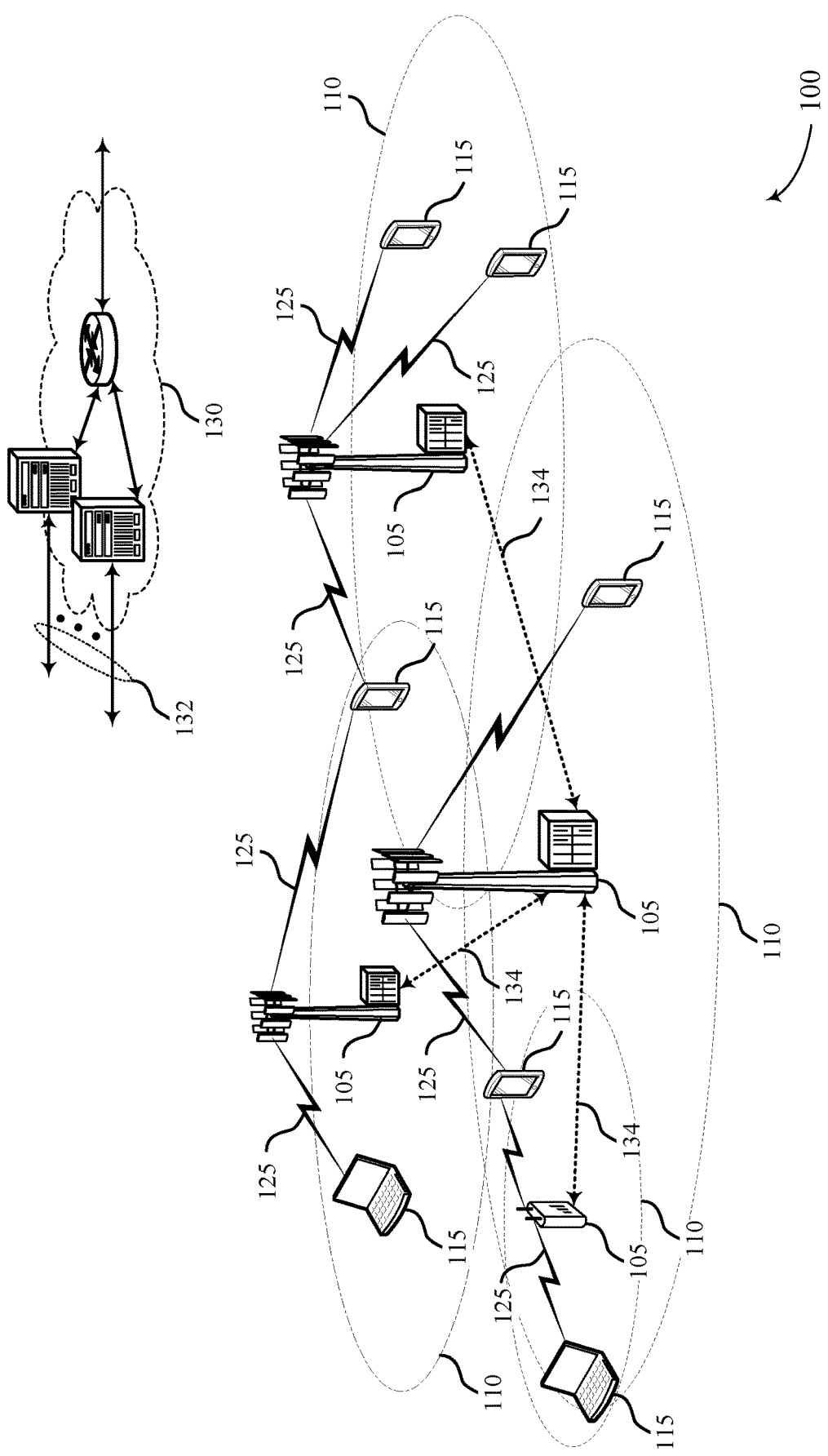
FIG. 1 illustrates an example of a wireless communications system that supports multiplexing CBG-level and TB-level feedback in accordance with aspects of the present disclosure.

The described techniques relate to improved methods, systems, devices, and apparatuses that support multiplexing CBG-level and TB-level feedback (e.g., ACK/NACK feedback). According to one or more aspects of the present disclosure, a first device may transmit a data transmission to a second device according to a TB arrangement (e.g., a set of TBs), where each TB may be associated with a unique feedback identifier (e.g., HARQ ID) for coordinating transmission and retransmission operations. Each transmitted TB may include one or more CBGs, and each CBG may include at least one CB. The second device may receive all of the data transmission, none of the data transmission, or some portion of the transmission, and in response the second device may provide a feedback transmission to the first device that includes TB-level feedback (e.g., TB-level ACK/NACK) for a portion of the data transmission (e.g., a first portion of the set of TBs), and CBG-level feedback (e.g., CBG-level ACK/NACK) for a portion of the transmitted data (e.g., a second portion of the set of TBs).

The multiplexed CBG-level and TB-level feedback may be in the form of a bit sequence, and may include various feedback signaling arrangements including those described herein. For example, as indicated by a particular signaling arrangement, a value of "1" in a portion of the bit sequence (e.g., a subsequence) may indicate an ACK for a particular TB or CBG, and a value of "0" in the portion of the bit sequence may indicate a NACK for a particular TB or CBG. The feedback signaling arrangements may be identified based at least in part on implicit or explicit signaling from the first device indicating a configuration for providing feedback, or indicating an amount of resources available for providing feedback. The identified feedback signaling arrangements may be associated with a semi-static configuration, or an indication that accompanies a particular data transmission.

In some examples the second device may determine a feedback signaling arrangement (e.g., based on the capabilities of the second device, or the feedback requirements of a particular data transmission received by the second device), which may subsequently be signaled explicitly or implicitly by the second device to the first device (e.g., as a semi-static configuration, or signaling accompanying the feedback to the received data). In some examples, a feedback signaling arrangement may be selected in order to balance the utilization of TB-level feedback and CBG-level feedback, and the signaling required for the particular feedback signaling arrangement, in the context of available communications resources and various network conditions.

By multiplexing CBG-level and TB-level feedback in accordance with aspects of the present disclosure, a wireless communications system can support more efficient communications resource utilization than TB-level feedback alone by reducing redundant retransmissions of CBG-level data (e.g., a redundant retransmission of a CBG that was received successfully, but accompanied a CBG of the same TB that was not received successfully), while also utilizing fewer communications resources than when supporting CBG-level feedback alone.

Aspects of the disclosure are initially described in the context of a wireless communications system. Aspects of the disclosure are further illustrated by and described with reference to apparatus diagrams, system diagrams, examples of feedback signaling arrangements, and flowcharts that relate to multiplexing code block group level and transport block level feedback.

Although examples of multiplexed CBG-level and TB-level feedback are described in the context of data transmissions from a base station 105 to a UE 115 (e.g., downlink data transmissions) and accompanying feedback transmissions from the UE 115, multiplexed CBG-level and TB-level feedback in accordance with the present disclosure may also be performed in the context of data transmissions from a UE 115 to a base station 105 (e.g., uplink data transmissions) and accompanying feedback from the base station 105, or in the context of data transmissions from a first UE 115 to a second UE 115 (e.g., peer-to-peer data transmissions, machine-to-machine data transmissions, mesh network data transmissions, etc.) and accompanying feedback from the second UE 115 or some other device.

FIG. 1 illustrates an example of a wireless communications system 100 that supports multiplexing CBG-level and TB-level feedback in accordance with various aspects of the present disclosure. The wireless communications system 100 includes base stations 105, UEs 115, and a core network 130. In some examples, the wireless communications system 100 may be an LTE network, an LTE-A network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, MulteFire, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some examples, the wireless communications system 100 may arrange transmissions according to TBs, which may be associated with an increment of transmission via a protocol layer (e.g., via a MAC layer). In some examples a TB may also correspond to an amount of data transmitted in a particular TTI (e.g., a subframe), and may be assigned with a HARQ ID to facilitate transmission and retransmission operations. A TB may include a plurality of CBs, which are smaller increments of data that form a TB.

In some examples, when a number of CBs for a particular HARQ ID is greater than a number of bits available for feedback, feedback bundling may be performed across groups of codeblocks (e.g., CBGs) of that HARQ ID so that feedback fits within the available resources. In a first example of such bundling, a device may determine a bundling size (e.g., a number of CBs per CBG) such that the number of CBGs for a particular HARQ ID are less than or equal to the number of feedback resources for that HARQ ID. In an example, the bundle size may be subject to the constraint that a ceiling function of the number of CBs or CBGs divided by the bundle size is less than the number of acknowledgement resources $$\left(\text{e.g., } \left\lceil \frac{\text{number of } CBs}{\text{bundle size}} \right\rceil < \text{number of acknowledgement bits,} \right.$$
$$\left. \left\lceil \frac{\text{number of } CBGs}{\text{bundle size}} \right\rceil < \text{number of acknowledgement bits} \right).$$

The device may accordingly divide the CBs into CBGs of the determined bundle size, and provide the CBG-level feedback on the CBGs having the determined bundle size. In some examples, the bundle size of different CBGs may be different (e.g., a last CBG may have fewer than the bundle size number of CBs). For example, for a HARQ ID having six CBs and four bits for ACK/NACK feedback, the CBG bundle size would be two CBs, and the associated ACK/NACK feedback would use the first three ACK/NACK bits, and may not use the fourth ACK/NACK bit. In another example of bundling, CBGs may be determined with two different sizes. For example, for M CBGs of a first size X, and N CBGs of a second size X−1, a total number of CBs in a TB may be equal to M*X+N*(X−1), and a number of ACK/NACK bits may be equal to M+N. In an example with six CBs and four ACK/NACK resources, a CB-to-ACK resource mapping for the six CBs may follow the arrangement given by (CB0+CB1, CB2+CB3, CB4, CB5).

An alternative approach may include using a fixed CBG size and vary the number of bits for different HARQ IDs based on the number of scheduled codeblocks. For example, for CBGs having a size of two CBs each, a data transmission (e.g., a first PDSCH transmission) including four CBs may use two feedback resources, and a data transmission (e.g., a second PDSCH transmission) including six CBs may use three feedback resources. Since a receiving device may indicate with a bitmap which data transmissions have CBG-level feedback, the devices exchanging information may still be in sync as long as there are no false physical downlink control channel (PDCCH) detections.

In accordance with one or more aspects of the present disclosure, devices of the wireless communications system 100 may support multiplexing CBG-level feedback (e.g., ACK/NACK feedback, HARQ feedback) with TB-level feedback. For example, a device of the wireless communications system 100 (e.g., a UE 115 or a base station 105) may support receiving a set of TBs, each of the TBs comprising one or more CBGs, generating a bit sequence providing CBG-level feedback on a first subset of TBs in the set of TBs and TB-level feedback on at least a second subset of TBs in the set of TBs, the first subset differing from the second subset, and transmitting the bit sequence. Further, a device of the wireless communications system 100 (e.g., a base station 105 or a UE 115) may support transmitting a set of TBs, each of the TBs comprising one or more CBGs, receiving a bit sequence providing CBG-level feedback on a first subset of TBs in the set of TBs and TB-level feedback on at least a second subset of TBs in the set of TBs, the first subset differing from the second subset, and retransmitting at least one CBG (e.g., a CBG for each TB in the first subset of TBs, such as CBGs associated with a CBG-level NACK, or each CBG for certain TBs in the second subset of TBs, such as each CBG associated with a TB-level NACK, or a combination thereof) based at least in part on the bit sequence.

By multiplexing CBG-level and TB-level feedback in accordance with various aspects of the present disclosure, devices of the wireless communications system 100 (e.g., base stations 105 or UEs 115) can support more efficient communications resource utilization than TB-level feedback alone by reducing redundant retransmissions of CBG-level data (e.g., a redundant retransmission of a CBG that was received successfully, but accompanied a CBG of the same TB that was not received successfully), while also utilizing fewer communications resources than when supporting CBG-level feedback alone.

Figure 2:
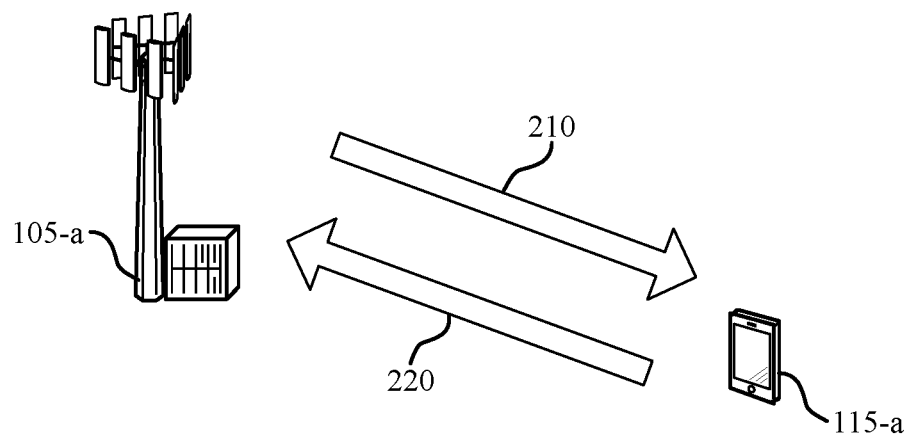
FIG. 2 illustrates an example of a wireless communications system that supports multiplexing CBG-level and TB-level feedback in accordance with aspects of the present disclosure.

FIG. 2 illustrates an example of a wireless communications system 200 that supports multiplexing CBG-level and TB-level feedback in accordance with various aspects of the present disclosure. In some examples, wireless communications system 200 may implement aspects of wireless communications system 100. Wireless communications system 200 may include a base station 105-a and a UE 115-a, which may be examples of the corresponding devices described with reference to FIG. 1. A first device (e.g., base station 105-a) may transmit data transmission 210 to a second device (e.g., UE 115-a), which may indicate a number of HARQ IDs (e.g., particular TBs, HARQ IDs associated with particular TBs) included in the data transmission 210. In response, the second device may provide feedback transmission 220 to the first device indicating which portions of the data transmission 210 were successfully received. For example, the UE 115-a may provide feedback transmission 220 that includes multiplexed CBG-level feedback and TB-level feedback in response to the data transmission 210, which may be in the form of a bit sequence. The second device may receive and process the feedback transmission 220 (e.g., containing a feedback bit sequence), and retransmit TB-level retransmissions, CBG-level retransmissions, or a combination thereof, based at least in part on the indications of the feedback transmission 220.

The feedback transmission 220 may be provided in accordance with a configuration of the data transmission 210, and an availability of resources for the feedback transmission 220. For example, in unlicensed operation (e.g., operation using an unlicensed radio frequency spectrum band), there may be uncertainty regarding when the UE 115-a can send feedback transmission 220 (e.g., ACK/NACK feedback, HARQ feedback), as the UE 115-a may be required to perform an LBT procedure before using resources of an unlicensed radio frequency spectrum for transmitting the feedback transmission 220. In the event of back-to-back data transmissions by the base station 105-a (e.g., physical downlink shared channel (PDSCH) transmissions in back-to-back subframes of the data transmissions 210), the requirement to perform an LBT procedure may therefore lead to transmissions being dropped due to LBT failures, or overlapping occasions to transmit the feedback transmission 220. A solution to accommodate this approach is to send feedback for all HARQ processes (e.g., all HARQ IDs of the back-to-back subframes of the data transmission 210) in the same subframe as a transmission opportunity associated with the LBT procedure. This may result in feedback transmission 220 including feedback for a number of HARQ IDs being multiplexed and transmitted in a single subframe.

In some NR systems, CB-level ACK/NACK feedback may be supported, but providing ACK/NACK for each CB of a TB may substantially increase feedback overhead as compared with providing TB-level feedback. Further, since the number of CBs may be dynamic (e.g., based on TB size scheduled in a PDCCH), reserving resources for a worst-case feedback scenario (e.g., reserving resources to accommodate feedback for every CB associated with the number of HARQ IDs) may be an inefficient use of communications resources. Thus, in accordance with one or more aspects of the present disclosure, CBG-level feedback may be sent for a subset of TBs of the data transmission 210.

In some examples, the UE 115-a may receive control information (e.g., from the base station 105-a, which may include an RRC configuration), indicating that the UE 115-a provide such CBG-level feedback (e.g., CBG-level feedback multiplexed with TB-level feedback for at least some of the TBs of the data transmission). In some examples the control information may specify a number of feedback resources (e.g., a number of bits) to use for a feedback process or for a particular HARQ ID, or a set of grants corresponding to a set of feedback processes, or a number of feedback processes and a feedback identifier corresponding to each feedback process, or a start location and number of bits, or a number of bits for CBG-level feedback for a particular feedback process of a plurality of feedback processes, or any combination thereof. In some examples, the control information may include information corresponding to a TB (e.g., TB-specific control information, control information specific to a HARQ ID), which may specify an offset within the bit sequence where the feedback for the TB is to be sent, a number of bits to use for HARQ feedback for the TB, an indication of whether TB-level or CBG-level feedback is to be used for the TB, or a combination thereof. For grants associated with multiple TTIs, a number of bits allocated for feedback may be the same for all TBs or HARQ IDs, or may be configured independently for each TB or HARQ ID. In some examples, for multiple TTI grants, an offset may be specified for only a first TTI. In some examples, the offset for the other TTIs may be computed from the offset for the first TTI and number of feedback bits associated with each TTI.

An indication of the TBs of the data transmission 210 for which CBG-level feedback is sent (e.g., an indication of the HARQ IDs associated with CBG-level feedback) may be communicated at least partly through a bit sequence, a bit map, an index, an order in which NACKs appear in the TB-level feedback, or various combinations thereof. A bitmap or size of an index may be based on a number of TB-level NACKs corresponding to the feedback transmission 220, in which case the bit map or size of index of the feedback transmission 220 may be variable. In some examples a bit map or size of index may be based on the number of TBs in the data transmission 210, in which case the bit map or size of index of the feedback transmission 220 may be fixed (e.g., according to a semi-static configuration). In some examples, if a number of unsuccessfully received TBs in the set of TBs is below a threshold, at least a portion of the bit sequence may be set to a predetermined sequence or set to a parity sequence.

Bit sequences used for the feedback transmission 220 may be arranged in various feedback signaling arrangements, including those described herein. A bit sequence may include various subsequences, which may include a subsequence for providing TB-level feedback, a subsequence for providing CBG-level feedback, a subsequence providing a bitmap to indicate which TBs are being provided with CBG-level feedback, a subsequence for providing an index to indicate which TBs are being provided with CBG-level feedback, a subsequence for parity bits, or various combinations thereof, according to a particular feedback signaling arrangement. Further, in various examples a subsequence may be arranged in non-consecutive bits. In some feedback signaling arrangements for the feedback transmission 220, TB-level feedback may be transmitted for all TBs of the data transmission 210, or alternatively TB-level feedback may be sent only for a subset of the TBs of the data transmission 210 for which CBG-level feedback is not sent. In some examples the selected feedback method (e.g., a selected feedback signaling arrangement of the feedback transmission 220) may be a function of total number of feedback bits, or a total number of TBs, or a number of TB-level NACKs corresponding to the feedback transmission, or a CBG size, or a combination thereof.

In some examples the transmission resources allocated for the feedback transmission 220 may be fixed, and the receiving device (e.g., the UE 115-a) may need to determine which TB of the data transmission 210 to send CBG-level feedback for in the feedback transmission 220. For example, if there are N resources for CBG-level feedback, but the UE 115-a has more than N TBs for which CBG-level feedback would help (e.g., more than N TBs each having at least one successfully received CBG and at least one unsuccessfully received CBG), the UE 115-a may need to select which TBs to send CBG-level feedback for in the feedback transmission 220.

In some examples, the UE 115-a may select one or more TBs (e.g., selecting certain HARQ IDs) on which to provide CBG-level feedback based at least in part on reducing or minimizing wasted transmission resources. For example, for each TB of the data transmission 210, the UE 115-a may determine the size of positively acknowledged codeblocks to be equal to the sum of sizes of CBs or CBGs of the TB for which CB-level or CBG-level CRC is successful. The UE 115-a may subsequently send CBG-level feedback for TBs having at least one CBG-level NACK, starting with the TB with the largest size of positively acknowledged codeblocks. Thus, the UE 115-a may prioritize providing CBG-level feedback for those TBs having at least one CBG-level NACK, but a relatively high ratio of CBG-level ACKs, to reduce or minimize the retransmission of CBGs associated with a successful CRC.

In another example, the UE 115-a may finish receiving TBs (e.g., associated with certain HARQ IDs) having relatively few CBGs being unsuccessfully received, so the UE 115-a may determine to provide CBG-level feedback for a particular TB in a set of TBs based on a number of CBGs yet to be successfully received. Additionally or alternatively, the UE 115-a may prioritize CBG-level feedback for TBs having a high or low ratio of CBs that pass error detection (e.g., pass a CRC). A coding rate may be adjusted for a TB having a low CB pass ratio to improve the likelihood of CBs passing error detection in a retransmission. Because, for retransmission, the CBGs that were positively acknowledged are not retransmitted, this approach may support applying a lower code rate for the CBGs that are retransmitted. In some examples, the UE 115-a may select one or more TBs for CBG-level feedback based on the total number of codeblocks, the total amount of information (e.g., information bits) of the CBGs that were successfully decoded, a TB index, or other conditions or characteristics.

In some examples it may be preferable to mandate behavior of the UE 115-a to facilitate certain network performance, rather than permit behavior of the UE 115-a that improves performance of the UE 115-a at the expense of network resources. Thus, the wireless communications system 200 (e.g., the base station 105-a) may be configured for a certain type of CBG-level feedback selection, which may be predetermined or preconfigured, signaled by the base station 105-a as part of connection establishment (e.g., an RRC configuration), or dynamically signaled.

In some examples, an amount of communications resource allocated to feedback signaling (e.g., a number of HARQ ACK/NACK bits) may be dynamic based on the amount of data in the data transmission 210 (e.g., a number of allocated PDCCH transmissions, or a number of downlink grants) or may be semi-static (e.g., determined based on the RRC configuration of the UE 115-a). For example, the number N of CBG-level feedback resources may be dynamically changed by the UE 115-a based at least in part on the PDCCH indications received by the UE 115-a. In some examples a set of feedback resources may be selected based on the number of feedback bits required for the feedback transmission 220. Alternatively, the resources allocated for the feedback transmission 220 may be fixed, but the UE 115-a may communicate a different number of bits by changing the coding rate for the feedback transmission 220.

In some examples the resources for the feedback transmission 220 may be allocated by the base station 105-a. For example, the base station 105-a may use PDCCH signaling to indicate that the UE 115-a may use Y bits for ACK/NACK feedback. In some examples an indication may be sent by the base station 105-a in PDCCH for the UE 115-a to select one of the configured physical uplink control channel (PUCCH) format/length/resource to be used in uplink for the feedback transmission 220.

Because the base station 105-a may not know how much of the data transmission 210 (e.g., how many CBs or CBGs, or how many PDCCH transmissions) the UE 115-a received, the base station 105-a may be required to perform blind decoding to evaluate different possibilities of how much of the data transmission 210 was received by the UE 115-a. Additionally or alternatively, each PDCCH may indicate total amount of information for feedback transmission 220 (e.g., a total number of TB-level and CBG-level ACK/NACK bits) to avoid blind decoding at the base station 105-a. As long as the UE 115-a receives at least one PDCCH, the UE 115-a may know how many bits to use for the feedback transmission 220. A similar approach may be applied for the other indicators described for multiplexing CBG-level and TB-level feedback, to avoid blind decoding at the base station 105-a.

Figure 3:
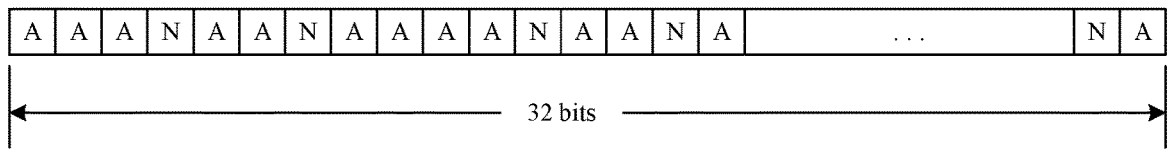
FIG. 3 illustrates an example of a feedback signaling arrangement that supports multiplexing CBG-level and TB-level feedback in accordance with aspects of the present disclosure.
Figure 3:
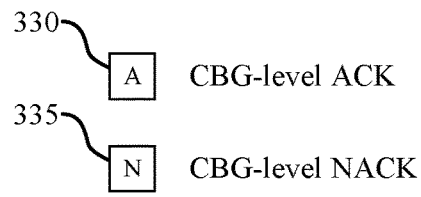

FIG. 3 illustrates an example of a feedback signaling arrangement 300 that supports multiplexing CBG-level and TB-level feedback in accordance with various aspects of the present disclosure. In some examples, the feedback signaling arrangement 300 may implement aspects of wireless communications systems 100 or 200. For example, feedback signaling arrangement 300 may be one example of providing feedback transmission 220 described with reference to FIG. 2 (e.g., in response to a data transmission 210 of eight TBs, each having 4 CBGs). The feedback signaling arrangement 300 includes a bit sequence 310, which may include a combination of CBG-level ACKs 330 and CBG-level NACKs 335.

In feedback signaling arrangement 300, the bit sequence 310 may include CBG-level feedback for each of eight TBs having 4 CBGs. Accordingly, the bit sequence 310 may be associated with 32 feedback bits for providing CBG-level feedback for each of the 32 total CBGs of the eight TBs. The approach of feedback signaling arrangement 300 may minimize the retransmission in a wireless communications system, because each of the CBGs may be associated with unique ACK/NACK feedback in the bit sequence 310. Devices of a wireless communications system may determine that the feedback signaling arrangement 300 is appropriate when uplink resources are not constrained, or when TB-level retransmission should be avoided. In some examples, a base station 105 may transmit an indication to a UE 115 to use the feedback signaling arrangement 300 under such conditions, or a UE 115 may employ the feedback signaling arrangement 300 when the UE determines that enough resources are available for feedback to employ such an approach. In some conditions, feedback transmission 220 may multiplex TB-level feedback for some or all of the TBs of a data transmission 210 with CBG-level feedback for a subset of the TBs of the data transmission 210, which may be accomplished using multiplexing feedback signaling arrangements such as those described with reference to FIGS. 4 through 8.

Figure 4:
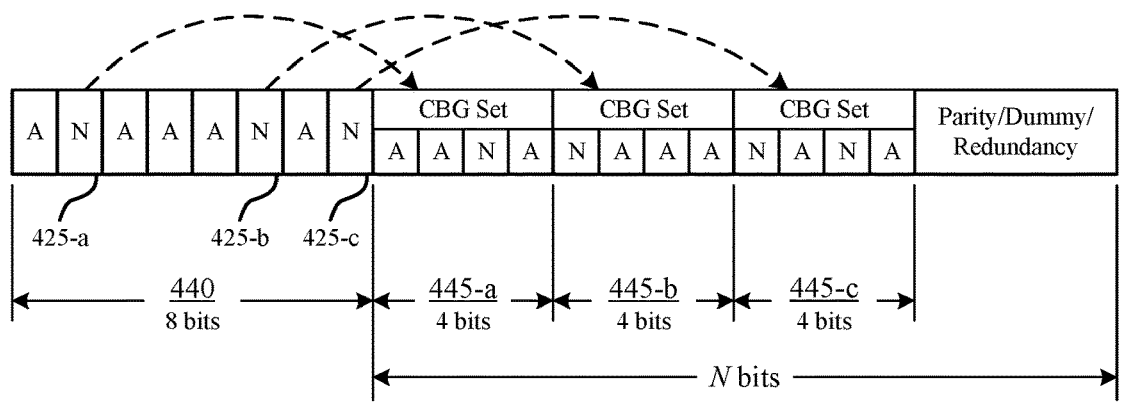
FIG. 4 illustrates an example of a feedback signaling arrangement that supports multiplexing CBG-level and TB-level feedback in accordance with aspects of the present disclosure.
Figure 4:
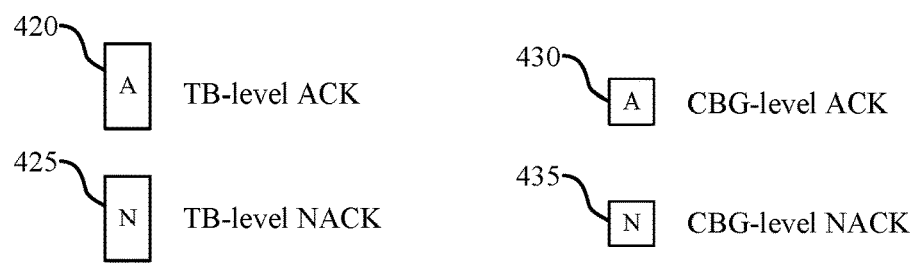

FIG. 4 illustrates an example of a feedback signaling arrangement 400 that supports multiplexing CBG-level and TB-level feedback in accordance with various aspects of the present disclosure. In some examples, feedback signaling arrangement 400 may implement aspects of wireless communications systems 100 or 200. For example, feedback signaling arrangement 400 may be one example of providing feedback transmission 220 described with reference to FIG. 2 (e.g., in response to a data transmission 210 having a set of eight TBs each having 4 CBGs). The feedback signaling arrangement 400 includes a bit sequence 410, which may include a combination of TB-level ACKs 420, TB-level NACKs 425, CBG-level ACKs 430, and CBG-level NACKs 435.

According to the example of feedback signaling arrangement 400, the bit sequence 410 may include a TB-level ACK/NACK set 440 (e.g., a subsequence), which may be a fixed resource (e.g., eight bits) that provides TB-level feedback for each of the TBs associated with a data transmission 210 (e.g., the eight TBs, associated with eight unique HARQ IDs). The bit sequence 410 may also include a fixed set of resources (e.g., N bits) allocated to CBG-level feedback for the data transmission 210, and CBG-level feedback may be provided according to CBG-level ACK/NACK sets 445 (e.g., CBG-level ACK/NACK set 445-*a* associated with TB-level NACK 425-*a*, CBG-level ACK/NACK set 445-*b* associated with TB-level NACK 425-*b*, and CBG-level ACK/NACK set 445-*c* associated with TB-level NACK 425-*a*).

Thus, the feedback signaling arrangement 400 may be an example of a fixed-resource arrangement, where certain resources are allocated to TB-level feedback, and certain resources are allocated to CBG-level feedback. In various examples, the fixed resources may be semi-statically configured (e.g., specifically associated with the use of the feedback signaling arrangement 400, or configured as part of a connection establishment between a UE 115 and a base station 105, such as an RRC configuration), or may be dynamically configured (e.g., according to specific allocation signaled by a base station with a data transmission 210, or based on an uplink grant received by the UE 115). In the event that all of the resources allocated to CBG-level feedback are not required for CBG-level feedback (e.g., if a number of unsuccessfully received TBs in the set of TBs is below a threshold), any remaining resources may be set to dummy bits, a predetermined bit sequence, or redundancy bits, or a type of parity check bits (e.g., a parity sequence, a predetermined parity check) to improve coding rate associated with the bit sequence 410. For example, the feedback signaling arrangement 400 may include a value or a sequence for a parity check bit in the bit sequence based at least in part on the first subsequence (e.g., a function of TB-level ACK/NACK set 440), or the second subsequence (e.g., a function of one or more of the CBG-level ACK/NACK sets 445), or any combination thereof. Accordingly, a device receiving the bit sequence 410 may generate an error detection decision based at least in part on processing a value for a parity check bit in the bit sequence that is based at least in part on the first subsequence, or the second subsequence, or both.

In some examples, CBG-level feedback may be provided in the order of HARQ IDs associated with a TB-level NACK 425 (e.g., in the order of TB-level NACKs 425-*a*, 425-*b*, and 425-*c*). In some examples the bit sequence 410 may further include additional bits to indicate that order of CBG-level feedback is in a reverse order of HARQ ID (e.g., in the order of TB-level NACKs 425-*c*, 425-*b*, and 425-*a*), or skips the first M TB-level NACKs 425. If resources allocated for CBG-level feedback are insufficient to transmit CBG-level feedback for all HARQ IDs associated with a TB-level NACK 425, certain HARQ IDs associated with a TB-level NACK 425 will not be given CBG-level feedback. In another example, the bit sequence 410 may include an index that identifies the TBs for which CBG-level feedback is provided, or an index indicating the HARQ ID of the TBs for which CBG-level feedback is provided, and in some examples the index may have a fixed bit width.

Because the example of feedback signaling arrangement 400 is associated with fixed resource allocations, the feedback signaling arrangement 400 may be associated with relatively low overhead (e.g., relatively low signaling associated with the allocation of resources, or signaling for decoding the bit sequence 410).

Figure 5:
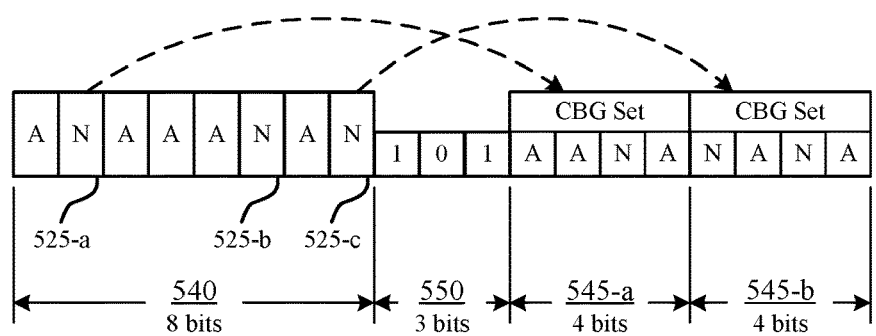
FIG. 5 illustrates an example of a feedback signaling arrangement that supports multiplexing CBG-level and TB-level feedback in accordance with aspects of the present disclosure.

FIG. 5 illustrates an example of a feedback signaling arrangement 500 that supports multiplexing CBG-level and TB-level feedback in accordance with various aspects of the present disclosure. In some examples, feedback signaling arrangement 500 may implement aspects of wireless communications systems 100 or 200. For example, feedback signaling arrangement 500 may be one example of providing feedback transmission 220 described with reference to FIG. 2 (e.g., in response to a data transmission 210 of eight TBs each having 4 CBGs). The feedback signaling arrangement 500 includes a bit sequence 510, which may include a combination of TB-level ACKs 520, TB-level NACKs 525, CBG-level ACKs 530, and CBG-level NACKs 535.

According to the example of feedback signaling arrangement 500, the bit sequence 510 may include a TB-level ACK/NACK set 540, which may be a fixed resource (e.g., eight bits) that provides TB-level feedback for each of the TBs associated with a data transmission 210. The bit sequence 510 may also include a bitmap 550 having a length equal to the number of TB-level NACKs 525 (e.g., a length of three bits corresponding to TB-level NACKs 525-*a*, 525-*b*, and 525-*c*). In other words, the bitmap 550 may include a bit (e.g., one bit, a single bit) corresponding to each of the TBs associated with a TB-level NACK 525, which may correspond to TBs or HARQ IDs that were not successfully received or decoded (e.g., in their entirety). Thus, the bitmap 550 may have a dynamic length depending on the results of a feedback process associated with a data transmission 210, and may map which of the TB-level NACKs 525 are associated with CBG-level feedback.

In the example of bit sequence 510, the bitmap 550 identifies that the first TB-level NACK 525 and the third TB-level NACK 525 are associated with CBG-level feedback (e.g., CBG-level ACK/NACK set 545-*a* associated with TB-level NACK 525-*b* and CBG-level ACK/NACK set 545-*b* associated with TB-level NACK 525-*c*, and no CBG-level ACK/NACK set 545 associated with TB-level NACK 525-*b*). In another example, the bit sequence 510 may include an index that identifies the TBs for which CBG-level feedback is provided, or an index indicating the HARQ ID of the TBs for which CBG-level feedback is provided, and in some examples the index may have a fixed bit width.

Thus, the feedback signaling arrangement 400 may be an example of a variable-resource arrangement, where certain resources are allocated in a fixed manner to TB-level feedback (e.g., the TB-level ACK/NACK set 540), and certain resources are allocated in a variable manner to CBG-level feedback (e.g., the combined feedback of bitmap 550 and CBG-level ACK/NACK sets 545-*a* and 545-*b*). The total resources available to a device providing feedback transmission 220 according to the feedback signaling arrangement 500 (e.g., a UE 115) may be may be semi-statically configured (e.g., specifically associated with the use of the feedback signaling arrangement 500, or configured as part of a connection establishment between a UE 115 and a base station 105, such as an RRC configuration), or may be dynamically configured (e.g., according to specific allocation signaled by a base station with a data transmission 210, or based on an uplink grant received by the UE 115). Thus, a device providing feedback transmission 220 may determine the bitmap 550 by selecting CBG-level feedback for certain HARQ IDs based on any of the considerations described herein (e.g., to reduce or minimize the retransmission overhead). In some examples the total resources available to the device providing feedback transmission 220 according to the feedback signaling arrangement 500 may not be preconfigured, and the device providing the feedback transmission 220 may determine how much of a generally available resource to use for the bit sequence 510 (e.g., based at least in part on a determined MCS, or based on balancing feedback transmission 220 with other transmissions within the available resource).

Because the example of feedback signaling arrangement 500 is associated with variable resource allocations, the feedback signaling arrangement 500 may be associated with nominally greater overhead (e.g., associated with the bitmap 550 of the bit sequence 510). However, the example of feedback signaling arrangement 500 may provide an improvement in resource utilization efficiency, because resources not required for transmitting the bit sequence 510 may be used for another purpose (e.g., communications other than feedback transmission 220).

Figure 6:
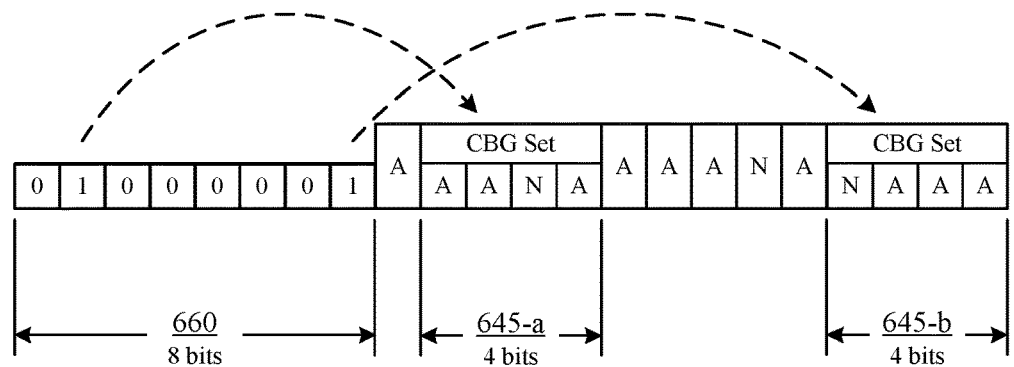
FIG. 6 illustrates an example of a feedback signaling arrangement that supports multiplexing CBG-level and TB-level feedback in accordance with aspects of the present disclosure.
Figure 6:
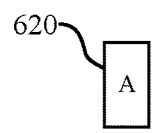
Figure 6:
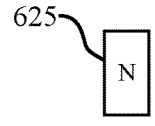
Figure 6:
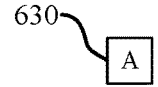
Figure 6:
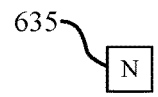

FIG. 6 illustrates an example of a feedback signaling arrangement 600 that supports multiplexing CBG-level and TB-level feedback in accordance with various aspects of the present disclosure. In some examples, feedback signaling arrangement 600 may implement aspects of wireless communications systems 100 or 200. For example, feedback signaling arrangement 600 may be one example of providing feedback transmission 220 described with reference to FIG. 2 (e.g., in response to a data transmission 210 of eight TBs each having 4 CBGs). The feedback signaling arrangement 600 includes a bit sequence 610, which may include a combination of TB-level ACKs 620, TB-level NACKs 625, CBG-level ACKs 630, and CBG-level NACKs 635.

According to the example of feedback signaling arrangement 600, the bit sequence 610 may include a bitmap 660 having a length equal to the number of TBs in a data transmission 210 (e.g., a length of eight bits). Thus, the bitmap 660 may have a fixed length regardless of the results of a feedback process associated with a data transmission 210, and may map which of the TBs are associated with CBG-level feedback. In other words, the bitmap 660 may include a bit for each of the TBs or HARQ IDs in a data transmission 210, and the bitmap 660 may indicate whether a particular TB or HARQ ID is associated with CBG-level feedback (e.g., whether a TB or HARQ ID is included in a first subset of the bit sequence 610) or TB-level feedback (e.g., whether a TB or HARQ ID is included in a second subset of the bit sequence 610). Following the bitmap 660, the bit sequence 610 may include an arrangement of TB-level and CBG-level feedback in accordance with the bitmap 660.

In the example of bit sequence 610, the bitmap 660 identifies that the second TB and the eighth TB are associated with CBG-level feedback (e.g., CBG-level ACK/NACK set 645-*a* associated with the second TB and CBG-level ACK/NACK set 645-*b* associated with the eighth TB). Accordingly, the bit sequence 610 may be arranged to include TB-level feedback for the first TB, followed by CBG-level feedback for the second TB (e.g., CBG-level ACK/NACK set 645-*a*), followed by TB-level feedback for the third through seventh TB, and CBG-level feedback for the eighth TB (e.g., CBG-level ACK/NACK set 645-*b*).

Thus, the feedback signaling arrangement 600 may be an example of a variable-resource arrangement, where certain resources are allocated in a fixed manner to a bitmap (e.g., bitmap 660), and certain resources are allocated in a variable manner to a combination of TB-level and CBG-level feedback (e.g., the combined feedback of TB-level ACKs 620, TB-level NACKs 625, and CBG-level ACK/NACK sets 645-*a* and 645-*b*). The total resources available to a device providing feedback transmission 220 according to the feedback signaling arrangement 600 (e.g., a UE) may be may be semi-statically configured (e.g., specifically associated with the use of the feedback signaling arrangement 600, or configured as part of a connection establishment between a UE 115 and a base station 105, such as an RRC configuration), or may be dynamically configured (e.g., according to specific allocation signaled by a base station with a data transmission 210, or based on an uplink grant received by the UE 115). Thus, a device providing feedback transmission 220 may determine the bitmap 660 by selecting CBG-level feedback for certain HARQ IDs based on any of the considerations described herein (e.g., to minimize the retransmission overhead). In some examples the total resources available to the device providing feedback transmission 220 according to the feedback signaling arrangement 600 may not be preconfigured, and the device providing the feedback transmission 220 may determine how much of a generally available resource to use for the bit sequence 610 (e.g., based at least in part on a determined MCS, or based on balancing feedback transmission 220 with other transmissions within the available resource).

Because the example of feedback signaling arrangement 600 is associated with variable resource allocations, the feedback signaling arrangement 600 may be associated with relatively greater overhead (e.g., associated with the fixed-length bitmap 660 of the bit sequence 610). However, the example of feedback signaling arrangement 600 may provide an improvement in resource utilization efficiency, because resources not required for transmitting the bit sequence 610 may be used for another purpose (e.g., communications other than feedback transmission 220). In comparison with the feedback signaling arrangement 500, for example, the feedback signaling arrangement 600 may utilize more resources for feedback transmission 220 when there are relatively few TB-level NACKs 625, as a result of the fixed-length bitmap 660. However, as the number of TB-level NACKs increase, the size of the bitmap 550 of the feedback signaling arrangement 500 will increase, and therefore the feedback signaling arrangement 500 may be less favorable (e.g., may utilize more resources for feedback transmission 220 than feedback signaling arrangement 600) in conditions with relatively many TB-level NACKs 525.

Figure 7:
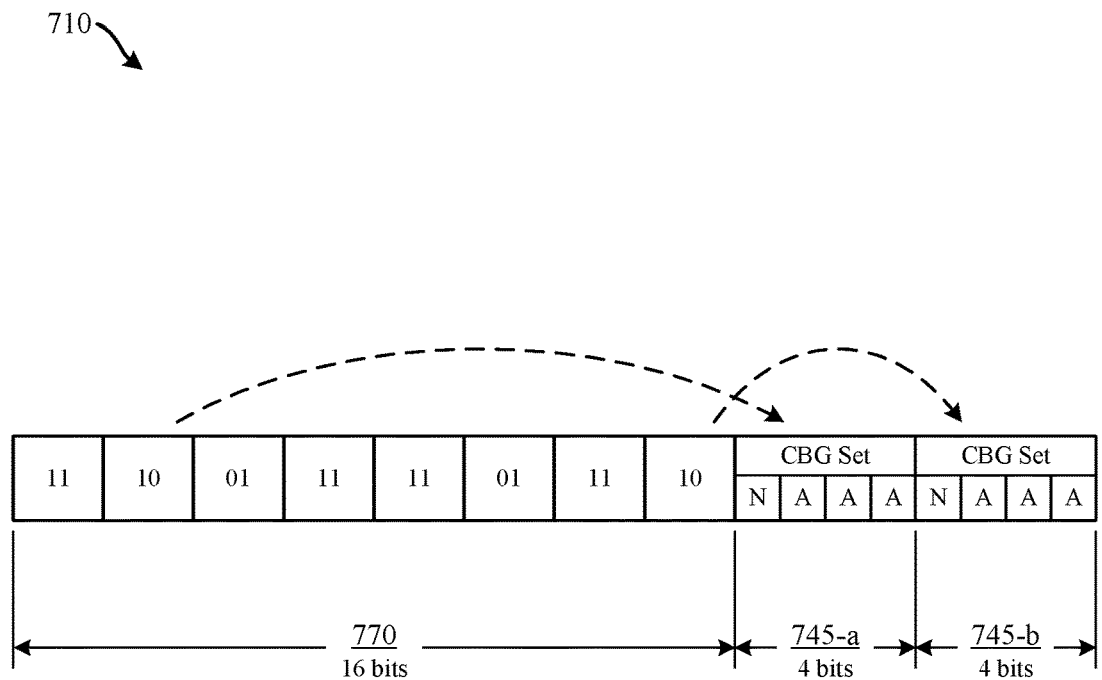
FIG. 7 illustrates an example of a feedback signaling arrangement that supports multiplexing CBG-level and TB-level feedback in accordance with aspects of the present disclosure.
Figure 7:
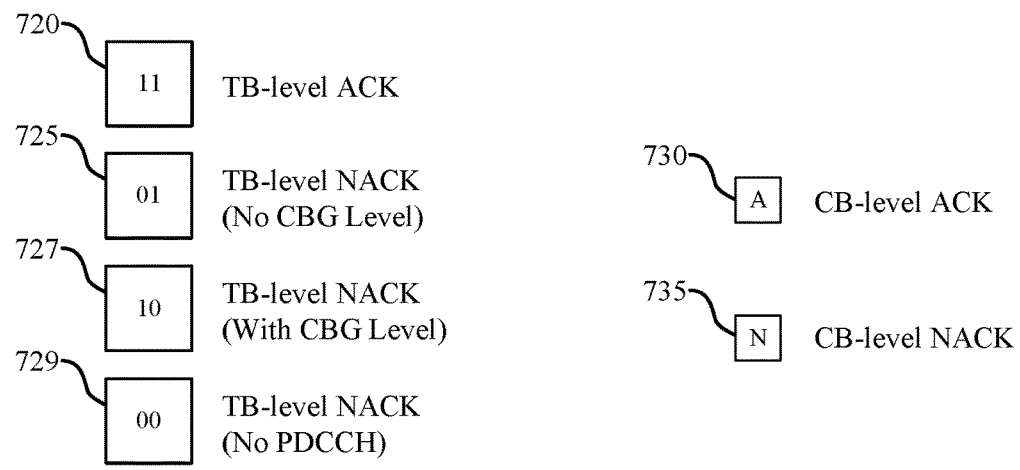

FIG. 7 illustrates an example of a feedback signaling arrangement 700 that supports multiplexing CBG-level and TB-level feedback in accordance with various aspects of the present disclosure. In some examples, feedback signaling arrangement 700 may implement aspects of wireless communications systems 100 or 200. For example, feedback signaling arrangement 700 may be one example of providing feedback transmission 220 described with reference to FIG. 2 (e.g., in response to a data transmission 210 of eight TBs each having 4 CBGs). The feedback signaling arrangement 700 includes a bit sequence 710, which may include a combination of a TB-level ACK/NACK set 770, CBG-level ACKs 730, and CBG-level NACKs 735.

According to the example of feedback signaling arrangement 700, the TB-level ACK/NACK set 770 may include enhanced TB-level feedback for each of the TBs in a data transmission. For example, each TB (e.g., according to HARQ ID) may be associated with a 2-bit feedback element. A first feedback element represented by the Boolean value "11" may be associated with a TB-level-ACK 720. A second feedback element represented by the Boolean value "01" may be associated with a TB-level NACK 725, further indicating that the respective TB is not associated with CBG-level feedback. A third feedback element represented by the Boolean value "10" may also be associated with a TB-level NACK 727, further indicating that the respective TB is associated with CBG-level feedback. A fourth feedback element represented by the Boolean value "00" may also be associated with a TB-level NACK 729, further indicating that a PDCCH was not received for the TB (e.g., as determined when HARQ IDs are received out of an expected sequence, or a receiving device otherwise determines that an expected PDCCH was not received).

Thus, the TB-level ACK/NACK set 770 may have a fixed length regardless of the results of a feedback process associated with a data transmission 210. The TB-level ACK/NACK set 770 may provide enhanced TB-level feedback (e.g., indicating a failure to receive an expected PDCCH for the fifth TB) while also mapping which of the TBs are associated with CBG-level feedback. Following the TB-level ACK/NACK set 770, the bit sequence 710 may include CBG-level feedback in accordance with the TB-level ACK/NACK set 770 (e.g., indicating CBG-level ACK/NACK set 745-*a* associated with the second TB of the data transmission 210, and CBG-level ACK/NACK set 745-*b* associated with the eighth TB of the data transmission 210.

Thus, the feedback signaling arrangement 700 may be an example of a variable-resource arrangement, where certain resources are allocated in a fixed manner to an enhanced TB-level feedback set (e.g., TB-level ACK/NACK set 770), and certain resources are allocated in a variable manner to CBG-level feedback (e.g., the combined feedback of CBG-level ACK/NACK sets 745-*a* and 745-*b*). The total resources available to a device providing feedback transmission 220 according to the feedback signaling arrangement 700 (e.g., a UE) may be may be semi-statically configured (e.g., specifically associated with the use of the feedback signaling arrangement 700, or configured as part of a connection establishment between a UE 115 and a base station 105), or may be dynamically configured (e.g., according to specific allocation signaled by a base station with a data transmission 210, or based on an uplink grant received by the UE 115).

Thus, a device providing feedback transmission 220 may determine the TB-level ACK/NACK set 770 by selecting CBG-level feedback for certain HARQ IDs based on any of the considerations described herein (e.g., to minimize the retransmission overhead). In some examples the total resources available to the device providing feedback transmission 220 according to the feedback signaling arrangement 700 may not be preconfigured, and the device providing the feedback transmission 220 may determine how much of a generally available resource to use for the bit sequence 710 (e.g., based at least in part on a determined MCS, or based on balancing feedback transmission 220 with other transmissions within the available resource).

Because the example of feedback signaling arrangement 700 is associated with variable resource allocations, the feedback signaling arrangement 700 may be associated with nominally greater overhead (e.g., associated with the fixed-length bitmap 760 of the bit sequence 710). However, the example of feedback signaling arrangement 700 may provide an improvement in resource utilization efficiency, because resources not required for transmitting the bit sequence 710 may be used for another purpose (e.g., communications other than feedback transmission 220). Further, the enhanced feedback signaling provided by the TB-level feedback set may be advantageously used to improve resource utilization. For example, based at least in part on the enhanced feedback signaling, a wireless communications system may modify a communication parameter in response to an indication that a PDCCH was not successfully received, such as increasing a transmission power, or switching communications to a different frequency channel.

Figure 8:
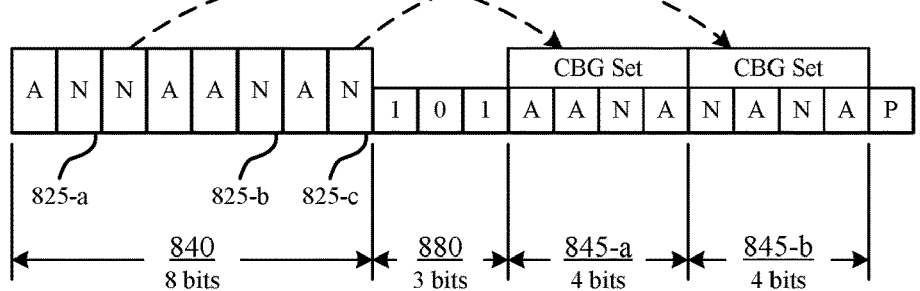
FIG. 8 illustrates an example of a feedback signaling arrangement that supports multiplexing CBG-level and TB-level feedback in accordance with aspects of the present disclosure.
Figure 8:
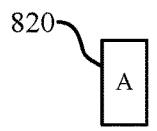
Figure 8:
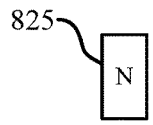
Figure 8:
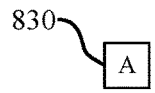
Figure 8:
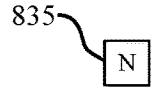

FIG. 8 illustrates an example of a feedback signaling arrangement 800 that supports multiplexing CBG-level and TB-level feedback in accordance with various aspects of the present disclosure. In some examples, feedback signaling arrangement 800 may implement aspects of wireless communications systems 100 or 200. For example, feedback signaling arrangement 800 may be one example of providing feedback transmission 220 described with reference to FIG. 2 (e.g., in response to a data transmission 210 of eight TBs each having 4 CBGs). The feedback signaling arrangement 800 includes a bit sequence 810, which may include a combination of TB-level ACKs 820, TB-level NACKs 825, CBG-level ACKs 830, and CBG-level NACKs 835.

According to the example of feedback signaling arrangement 800, the bit sequence 810 may include a TB-level ACK/NACK set 840, which may be a fixed resource (e.g., eight bits) that provides TB-level feedback for each of the TBs associated with a data transmission. The bit sequence 810 may also include a bitmap 880 having a length depending on the number of TB-level NACKs 825 in the TB-level ACK/NACK set, and the number of available resources for CBG-level feedback. Thus, the bitmap 880 may have a dynamic length depending on the results of a feedback process associated with a data transmission 210, and may map which of the HARQ IDs associated with a TB-level NACKs 525 are provided with CBG-level feedback.

In the example of feedback signaling arrangement 800, the total available resources may be equal to 20 bits. Thus, the number of available resources, after providing resources for the TB-level ACK/NACK set 840 may be equal to 12 bits. Having determined the number of resources available for CBG-level feedback, a device may determine a maximum number of TBs for which to provide CBG-level feedback based on the CBG-level indications themselves, and the length of the bitmap 880 required to indicate which of the TBs shall be provided with CBG-level feedback. The number of TBs K for which CBG-level feedback may be provided such feedback within F remaining bit resources (e.g., the total available bits minus the number of TBs) may be determined with the following equation:

$$(n*K)+\log_2(\text{choose}(N,K)) \leq F \quad (1)$$

where n is the number of CBGs per TB in the data transmission 210, N is the number of TBs associated with a TB-level NACK, and choose(N,K) equals the number of different combinations for choosing K TBs for CBG-level feedback from a pool of N candidates associated with a TB-level NACK 825. In the example of bit sequence 810, F=12 remaining bits available for CBG-level feedback, n=4 CBGs per TB, and N=4 TB-level NACKs 825 in the TB-level ACK/NACK set 840. Accordingly, K may be determined to be equal to two TBs for which CBG-level feedback may be provided, and properly identified among the candidate TBs having TB-level NACK. Therefore, the bit sequence 810 may include two CBG-level ACK/NACK sets 845.

In some examples, Equation (1) may assume that full flexibility is allowed in choosing K TBs from the N TBs with TB-level NACK. In some examples, by reducing selection flexibility to $2^L$ combinations, where L≤choose (N, K), a larger amount of CBG-level feedback may be accommodated in some cases. For example, to accommodate a larger K when selection flexibility is reduced to $2^L$ combinations, K may satisfy the following (e.g., instead of Equation (1)):

$$(n*K)+L \leq F \quad (2)$$

In order to identify which TBs shall be provided with CBG-level feedback, both the device transmitting the data transmission 210 and the device receiving the data transmission 210 may know a predetermined mapping (e.g., format) associated with the identification of TBs according to the resource allocation of Equation 1. For example, predetermined mapping 890 may be provide bit mapping for identifying two TBs from 4 TBs associated with a TB-level NACK 825 (e.g., six total candidates, equal to the result of choose(2, 4)). According to the predetermined mapping 890, when the bitmap 880 includes a value of "101" the second and fourth NACK'd TBs may be indicated as having CBG-level feedback. Accordingly, in the example of bit sequence 810, CBG-level ACK/NACK set 845-a may correspond to the third TB of the data transmission 210 (e.g., the second NACK'd TB), and CBG-level ACK/NACK set 845-b may correspond to the eighth TB of the data transmission 210 (e.g., the fourth NACK'd TB). Because the predetermined mapping 890 may be known to both devices exchanging transmissions, the device preparing the bit sequence 810 may properly define the length and contents of the bitmap 880, and the device receiving the bit sequence 810 may properly decode the bit sequence 810 (e.g., by knowing that the first eight bits are TB-level feedback, by determining that four of those TBs are associated with TB-level NACKs 825, and by knowing that that 20 total bit resources are available, which consequently points the receiving device to the predetermined mapping 890).

Thus, the feedback signaling arrangement 400 may be an example of a variable-resource arrangement, where certain resources are allocated in a fixed manner to TB-level feedback (e.g., the TB-level ACK/NACK set 840), and certain resources are allocated in a variable manner to CBG-level feedback (e.g., the combined feedback of bitmap 880 and CBG-level ACK/NACK sets 845-a and 845-b), but within a total number of available resources. The total resources available to a device providing feedback transmission 220 according to the feedback signaling arrangement 800 (e.g., a UE) may be may be semi-statically configured (e.g., specifically associated with the use of the feedback signaling arrangement 800, or configured as part of a connection establishment between a UE 115 and a base station 105), or may be dynamically configured (e.g., according to specific allocation signaled by a base station with a data transmission 210, or based on an uplink grant received by the UE 115). Thus, a device providing feedback transmission 220 may determine the bitmap 880 by first determining a number of TBs for which CBG-level feedback may be provided, and then by selecting CBG-level feedback for certain HARQ IDs based on any of the considerations described herein (e.g., to minimize the retransmission overhead).

Because the example of feedback signaling arrangement 800 is associated with variable resource allocations, the feedback signaling arrangement 800 may be associated with nominally greater overhead (e.g., associated with the computation for, and transmission of bitmap 880 of the bit sequence 810). However, the example of feedback signaling arrangement 800 may provide an improvement over other fixed-resource arrangements (e.g., feedback signaling arrangement 500 described with reference to FIG. 5) that do not support such dynamic selection and indication of TBs for which to provide CBG-level feedback.

In some examples of feedback signaling arrangements, including those described herein, a device transmitting a data transmission 210 may employ a control indicator to select a particular feedback signaling arrangement, or indicate a set of resources to be utilized in a feedback transmission 220. For example, when a base station 105 transmits a data transmission 210, the base station may use downlink control information (DCI) to indicate an offset in a feedback resource (e.g., an ACK/NACK resource), or a number of feedback resources to use for a particular HARQ ID, or set of HARQ IDs, for a particular set of grants.

For example, the base station 105 may indicate in a first grant, for a TB having HARQ ID=5, to use TB-level ACK/NACK feedback without an offset (e.g., at the beginning of a feedback transmission 220). The base station may indicate in a second grant, for a TB having HARQ ID=7, to use CBG-level feedback with an offset of 1 bit in the feedback transmission 220, and 4 bits for the CBG-level feedback. The base station may indicate in a third grant, for a TB having HARQ ID=1, to use CBG-level feedback with an offset of 5 in the feedback transmission 220, and 6 bits for the CBG-level feedback.

Because the DCI indicates the start location and number of ACK/NACK feedback bits for a particular grant, such an arrangement for feedback signaling may be robust to missed DCI transmissions. Bits corresponding to missed DCIs may, for example, be marked as a NACK. In some examples a false PDCCH decoding may cause overlapping feedback resources for two grants. Thus, a UE may set those bits to NACK to be safe, or eliminate one of the PDCCHs as a false PDCCH decode. In examples where the set of grants is associated with more than one TTI (e.g., a multi-TTI grant), the DCI may specify an offset for a first TTI, and other TTIs may use the same offset. In various examples, the number of bits for HARQ feedback may be the same for each TB or HARQ ID, or may be configured independently for each TB or HARQ ID.

Figure 9:
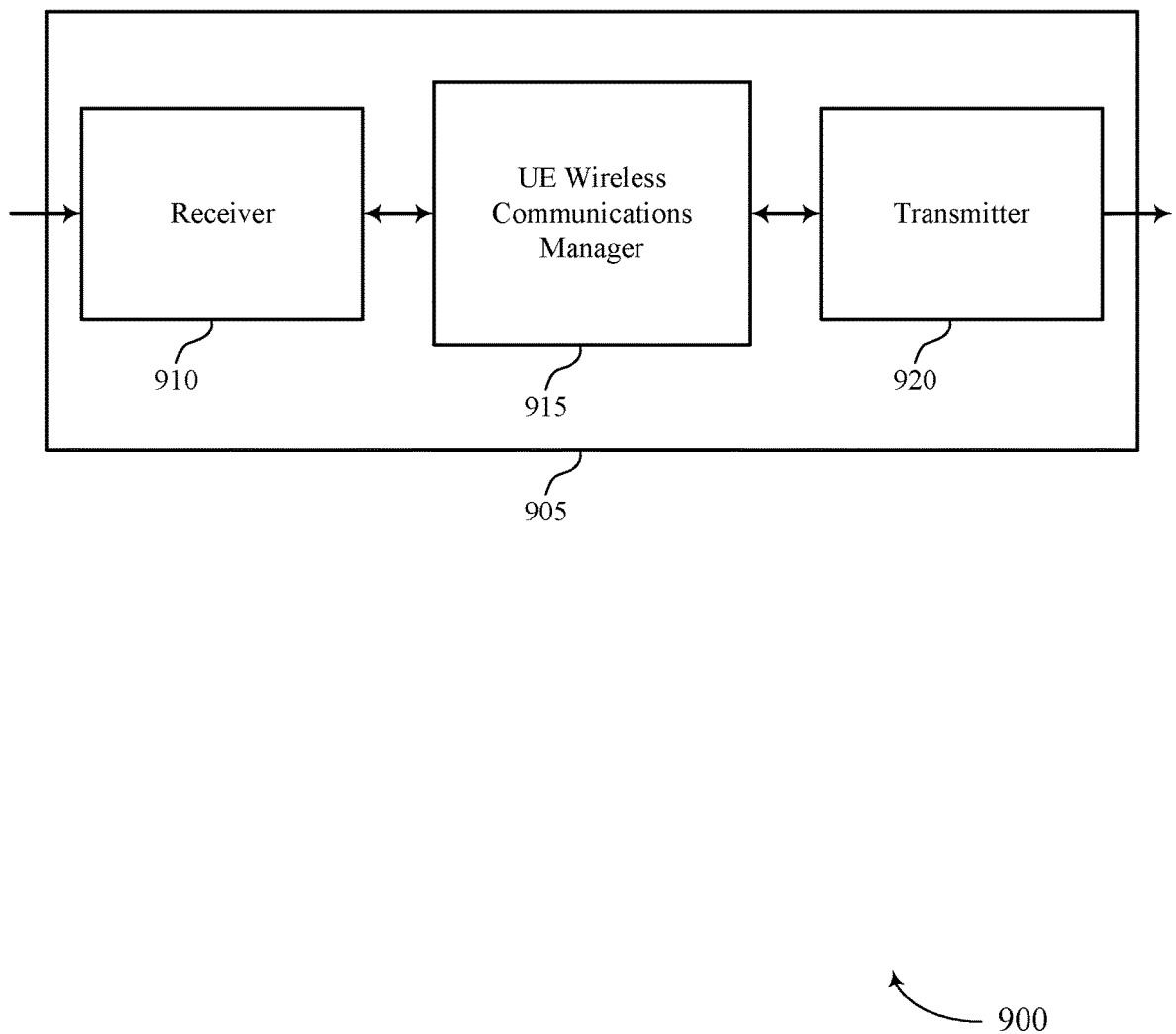
FIGS. 9 and 10 show block diagrams of a device that supports multiplexing code block group level and transport block level acknowledgments in accordance with aspects of the present disclosure.

FIG. 9 shows a block diagram 900 of a wireless device 905 that supports multiplexing code block group level and transport block level acknowledgments in accordance with aspects of the present disclosure. Wireless device 905 may be an example of aspects of a UE 115 as described herein.

Wireless device 905 may include receiver 910, UE wireless communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to multiplexing code block group level and transport block level acknowledgments, etc.). Information may be passed on to other components of the device. The receiver 910 may be an example of aspects of the transceiver 1235 described with reference to FIG. 12. The receiver 910 may utilize a single antenna or a set of antennas.

UE wireless communications manager 915 and/or at least some of its various sub-components may be implemented in hardware, software executed by a processor, firmware, or any combination thereof. If implemented in software executed by a processor, the functions of the UE wireless communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE wireless communications manager 915 and/or at least some of its various sub-components may be physically located at various positions, including being distributed such that portions of functions are implemented at different physical locations by one or more physical devices. In some examples, UE wireless communications manager 915 and/or at least some of its various sub-components may be a separate and distinct component in accordance with various aspects of the present disclosure. In other examples, UE wireless communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. UE wireless communications manager 915 may be an example of aspects of the UE wireless communications manager 1215 described with reference to FIG. 12.

UE wireless communications manager 915 may receive a set of TBs, each of the TBs including one or more CBGs, generate a bit sequence providing CBG-level feedback on a first subset of TBs in the set of TBs and TB-level feedback on at least a second subset of TBs in the set of TBs, the first subset differing from the second subset, and transmit the bit sequence. Although described in the context of operations performed by a UE 115, the operations and functions associated with the UE wireless communications manager 915 may also be associated with a base station 105 (e.g., relating to multiplexed CBG-level and TB-level feedback transmitted by a base station 105 in response to an uplink data transmission).

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
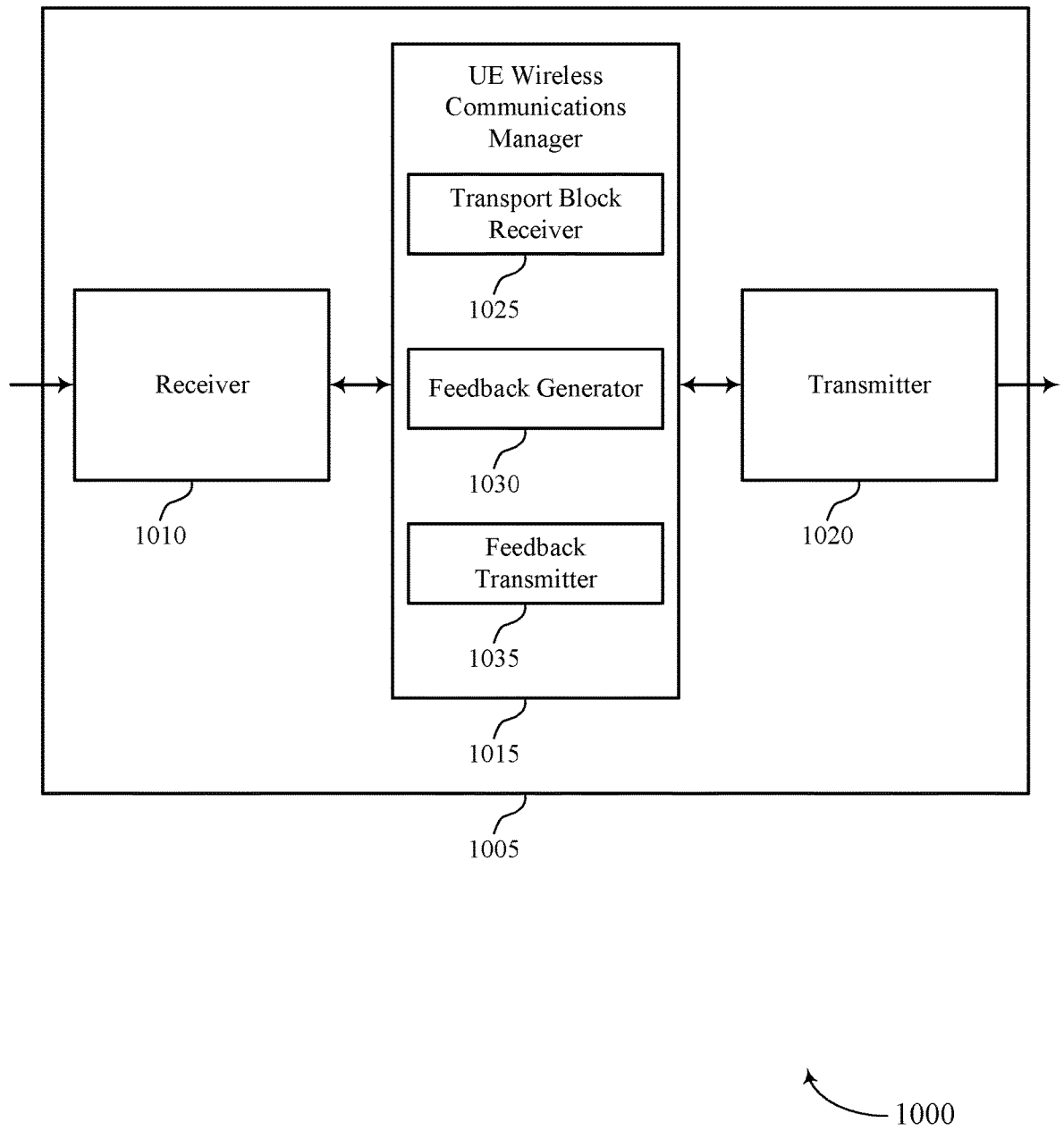

FIG. 10 shows a block diagram 1000 of a wireless device 1005 that supports multiplexing code block group level and transport block level acknowledgments in accordance with aspects of the present disclosure. Wireless device 1005 may be an example of aspects of a wireless device 905 or a UE 115 as described with reference to FIG. 9. Wireless device 1005 may include receiver 1010, UE wireless communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to multiplexing code block group level and transport block level acknowledgments, etc.). Information may be passed on to other components of the device. The receiver 1010 may be an example of aspects of the transceiver 1235 described with reference to FIG. 12. The receiver 1010 may utilize a single antenna or a set of antennas.

UE wireless communications manager 1015 may be an example of aspects of a UE wireless communications manager 915 described with reference to FIG. 9. UE wireless communications manager 1015 may include transport block receiver 1025, feedback generator 1030, and feedback transmitter 1035. UE wireless communications manager 1015 may be an example of aspects of the UE wireless communications manager 1215 described with reference to FIG. 12. Although described in the context of operations performed by a UE 115, the operations and functions associated with the UE wireless communications manager 1015 may also be associated with a base station 105 (e.g., relating to multiplexed CBG-level and TB-level feedback transmitted by a base station 105 in response to an uplink data transmission).

Transport block receiver 1025 may receive a set of TBs, each of the TBs including one or more CBGs.

In some examples, feedback generator 1030 may generate a bit sequence providing CBG-level feedback on a first subset of TBs in the set of TBs and TB-level feedback on at least a second subset of TBs in the set of TBs, the first subset differing from the second subset. In some examples, feedback generator 1030 may select to send the CBG-level feedback on a first TB in the first subset of TBs based on a number of CBGs of the first TB that pass error detection relative to a number of CBGs of a second TB that pass error detection. In some examples, feedback generator 1030 may select to send the CBG-level feedback on a first TB in the first subset of second TBs based on a ratio of CBGs of the first TB that pass error detection relative to a ratio of CBGs of a second TB that pass error detection. In some examples, feedback generator 1030 may select to send the CBG-level feedback for a TB based on a TB or HARQ ID index, the total number of codeblocks associated with a TB or HARQ ID, or a total amount of information in CBGs of the TB or HARQ ID that were successfully decoded. In some examples, feedback generator 1030 may determine that a number of CBGs exceeds an amount of available feedback resources, and generate CBG-level feedback for each of the bundles, or generate CBG-level feedback for each of the first set of bundles and the second set of bundles. In some examples, feedback generator 1030 may select to send the CBG-level feedback on a first TB in the first subset of TBs based on a ratio of CBGs of the first TB that pass error detection relative to a ratio of CBGs of a second TB that pass error detection, and on the number of bits.

Feedback transmitter 1035 may transmit the bit sequence.

In some cases, a CBG includes at least one code block. In some cases, the set of TBs are in an order, and where the first subset of TBs includes a defined number of TBs in the set of TBs at a beginning of the order, or the defined number of TBs in the set of TBs at an ending of the order, or the defined number of TBs in the set of TBs after skipping a second defined number of TBs in the order that were not successfully received. In some cases, the TB-level feedback is associated with a set of feedback processes each having a feedback identifier associated with a respective TB in the set of TBs. In some cases, generating the bit sequence includes: selecting to provide the CBG-level feedback on the first subset of TBs (e.g., selecting the first subset of TBs) based on a number of available bits in the bit sequence and a number of TBs in the set of TBs that were not successfully received. In some cases, a number of TBs in the first subset of TBs corresponds to a defined number of resources allocated for the CBG-level feedback. In some cases, a CBG has a fixed size, and a number of bits in the bit sequence is a function of a number of scheduled CBGs.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
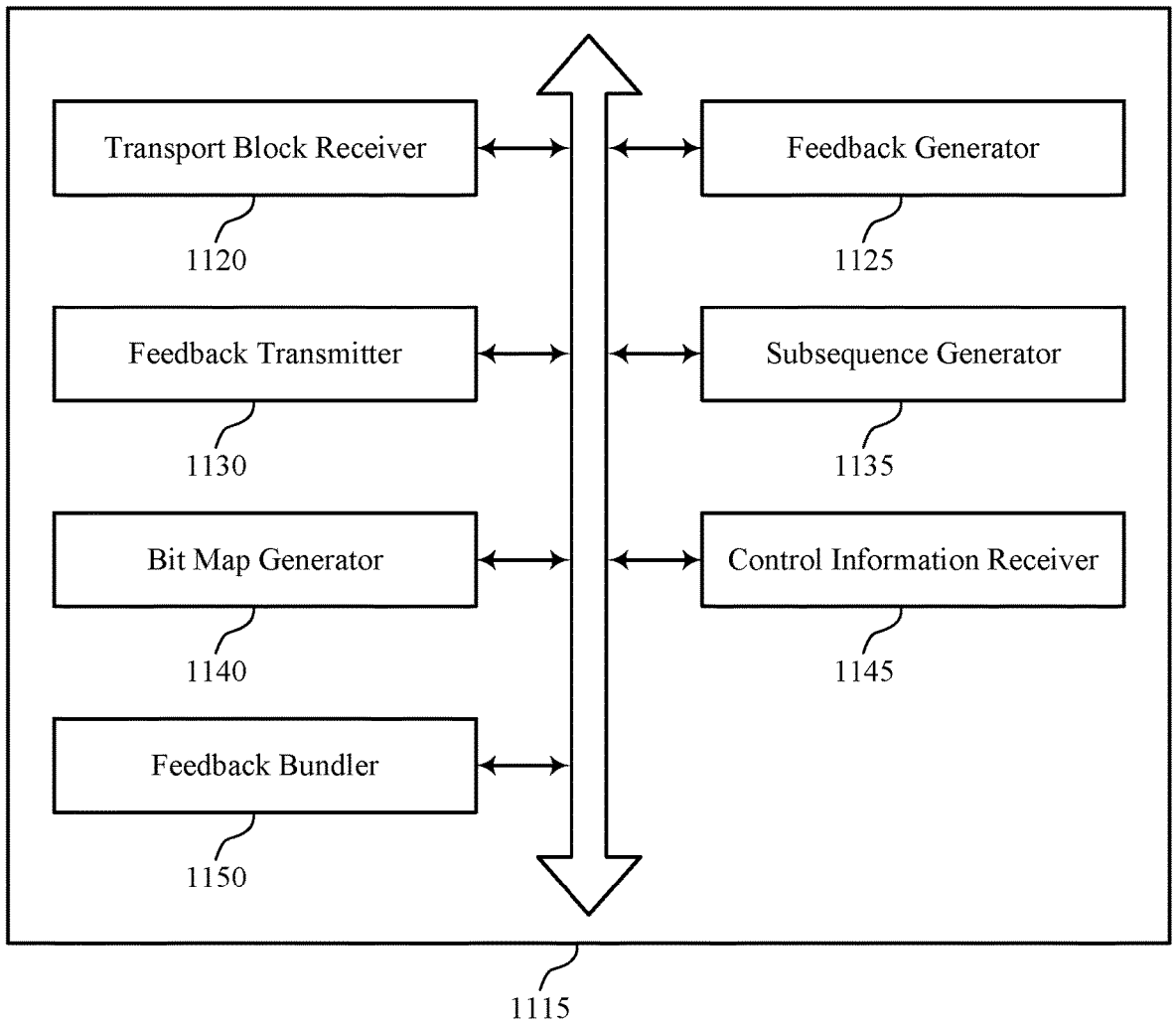
FIG. 11 shows a block diagram of a UE wireless communications manager that supports multiplexing code block group level and transport block level acknowledgments in accordance with aspects of the present disclosure.

FIG. 11 shows a block diagram 1100 of a UE wireless communications manager 1115 that supports multiplexing code block group level and transport block level acknowledgments in accordance with aspects of the present disclosure. The UE wireless communications manager 1115 may be an example of aspects of a UE wireless communications manager 915, a UE wireless communications manager 1015, or a UE wireless communications manager 1215 described with reference to FIGS. 9, 10, and 12. The UE wireless communications manager 1115 may include transport block receiver 1120, feedback generator 1125, feedback transmitter 1130, subsequence generator 1135, bit map generator 1140, control information receiver 1145, and feedback bundler 1150. Each of these modules may communicate, directly or indirectly, with one another (e.g., via one or more buses). Although described in the context of operations performed by a UE 115, the operations and functions associated with the UE wireless communications manager 1115 may also be associated with a base station 105 (e.g., relating to multiplexed CBG-level and TB-level feedback transmitted by a base station 105 in response to an uplink data transmission).

Transport block receiver 1120 may receive a set of TBs, each of the TBs including one or more CBGs.

In some examples, feedback generator 1125 may generate a bit sequence providing CBG-level feedback on a first subset of TBs in the set of TBs and TB-level feedback on at least a second subset of TBs in the set of TBs, the first subset differing from the second subset. In some examples, feedback generator 1125 may select to send the CBG-level feedback on a first TB in the first subset of TBs based on a number of CBGs of the first TB that pass error detection relative to a number of CBGs of a second TB that pass error detection. In some examples, feedback generator 1125 may select to send the CBG-level feedback on a first TB in the first subset of second TBs based on a ratio of CBGs of the first TB that pass error detection relative to a ratio of CBGs of a second TB that pass error detection. In some examples, feedback generator 1125 may select to send the CBG-level feedback for a TB based on a TB or HARQ ID index, the total number of codeblocks associated with a TB or HARQ ID, or a total amount of information in CBGs of the TB or HARQ ID that were successfully decoded. In some examples, feedback generator 1125 may determine that a number of CBGs exceeds an amount of available feedback resources, and generate CBG-level feedback for each of the bundles, or generate CBG-level feedback for each of the first set of bundles and the second set of bundles. In some examples, feedback generator 1125 may select to send the CBG-level feedback on a first TB in the first subset of TBs based on a ratio of CBGs of the first TB that pass error detection relative to a ratio of CBGs of a second TB that pass error detection, and on the number of bits.

Feedback transmitter 1130 may transmit the bit sequence.

In some examples, subsequence generator 1135 may generate the bit sequence to include a first subsequence that provides the TB-level feedback on each TB in the set of TBs, a second subsequence that identifies the first subset of TBs on which the bit sequence includes the CBG-level feedback, and a third subsequence that includes the CBG-level feedback on the first subset of TBs. In some examples, subsequence generator 1135 may select a format for the second subsequence based on one or more of a number of bits in the bit sequence, or a number of TBs in the set of TBs, or a number of TBs in the set of TBs that were not successfully received, or a CBG size, or any combination thereof. In some cases, generating the bit sequence includes: generating the bit sequence to include a first subsequence that provides the TB-level feedback on each TB in the set of TBs and a second subsequence that provides the CBG-level feedback on the first subset of TBs. In some cases, generating the bit sequence includes: generating (e.g., if a number of unsuccessfully received TBs in a set of TBs is below a threshold) a value for a parity check bit, a parity sequence, or a predetermined sequence in the bit sequence based on the first subsequence, or the second subsequence, or both. In some cases, generating the bit sequence includes: generating the bit sequence to include a first subsequence that provides the TB-level feedback on each TB in the set of TBs and a bit map in the bit sequence that identifies the first subset of TBs. In some cases, generating the bit sequence includes: generating the bit sequence to include a first subsequence that provides the TB-level feedback on each TB in the set of TBs and an index in the bit sequence that identifies the first subset of TBs. In some cases, the index has a fixed bit width. In some cases, generating the bit sequence includes: generating, in accordance with the bit map, a subsequence in the bit sequence to provide the CBG-level feedback for the first subset of TBs and the TB-level feedback for the second subset of TBs. In some cases, generating the bit sequence includes: generating a value for each 2 bits in a first subsequence of the bit sequence indicating whether a respective TB in the set of TBs was successfully received, or whether a control channel was successfully received, or whether the CBG-level feedback is being provided for the respective TB. In some cases, generating the bit sequence includes: generating a second subsequence of the bit sequence that provides the CBG-level feedback for the first subset of TBs in accordance with the indication of the first subsequence of whether the CBG-level feedback is being provided for the respective TB.

Bit map generator 1140 may generate a bit map in the bit sequence to indicate that the first subset of TBs includes the CBG-level feedback and that the second subset of TBs includes the TB-level feedback.

Control information receiver 1145 may receive control information indicating to provide the CBG-level feedback on the first subset of TBs and the TB-level feedback on the second subset of TBs. In some cases, the control information specifies an offset within a feedback resource for at least one of the TB-level feedback or the CBG-level feedback. In some cases, the control information specifies a number of feedback resources to use for a feedback process, or a set of grants corresponding to a set of feedback processes, or a number of feedback processes and a feedback identifier corresponding to each feedback process, or a start location and number of bits, or a number of bits for CBG-level feedback for a particular feedback process of a set of feedback processes, or any combination thereof. In some cases, generating the bit sequence includes: receiving control information specifying a number of bits to include in the bit sequence.

In some examples feedback bundler 1150 may determine a bundling size that does not exceed the amount of available feedback resources, and divide the CBs of the CBGs into bundles of the determined bundling size. In some examples feedback bundler 1150 may determine a first bundling size that does not exceed the amount of available feedback resources, determine a second bundling size as a function of the first bundling size, and divide a first subset of CBs of the CBGs into a first set of bundles of the first bundling size and a second subset of the CBs of the CBGs into a second set of bundles of the second bundling size.

In some cases, a CBG includes at least one code block. In some cases, the set of TBs are in an order, and where the first subset of TBs includes a defined number of TBs in the set of TBs at a beginning of the order, or the defined number of TBs in the set of TBs at an ending of the order, or the defined number of TBs in the set of TBs after skipping a second defined number of TBs in the order that were not successfully received. In some cases, the TB-level feedback is associated with a set of feedback processes each having a feedback identifier associated with a respective TB in the set of TBs. In some cases, generating the bit sequence includes: selecting to provide the CBG-level feedback on the first subset of TBs based on a number of available bits in the bit sequence and a number of TBs in the set of TBs that were not successfully received. In some cases, a number of TBs in the first subset of TBs corresponds to a defined number of resources allocated for the CBG-level feedback. In some cases, a CBG has a fixed size, and a number of bits in the bit sequence is a function of a number of scheduled CBGs.

Figure 12:
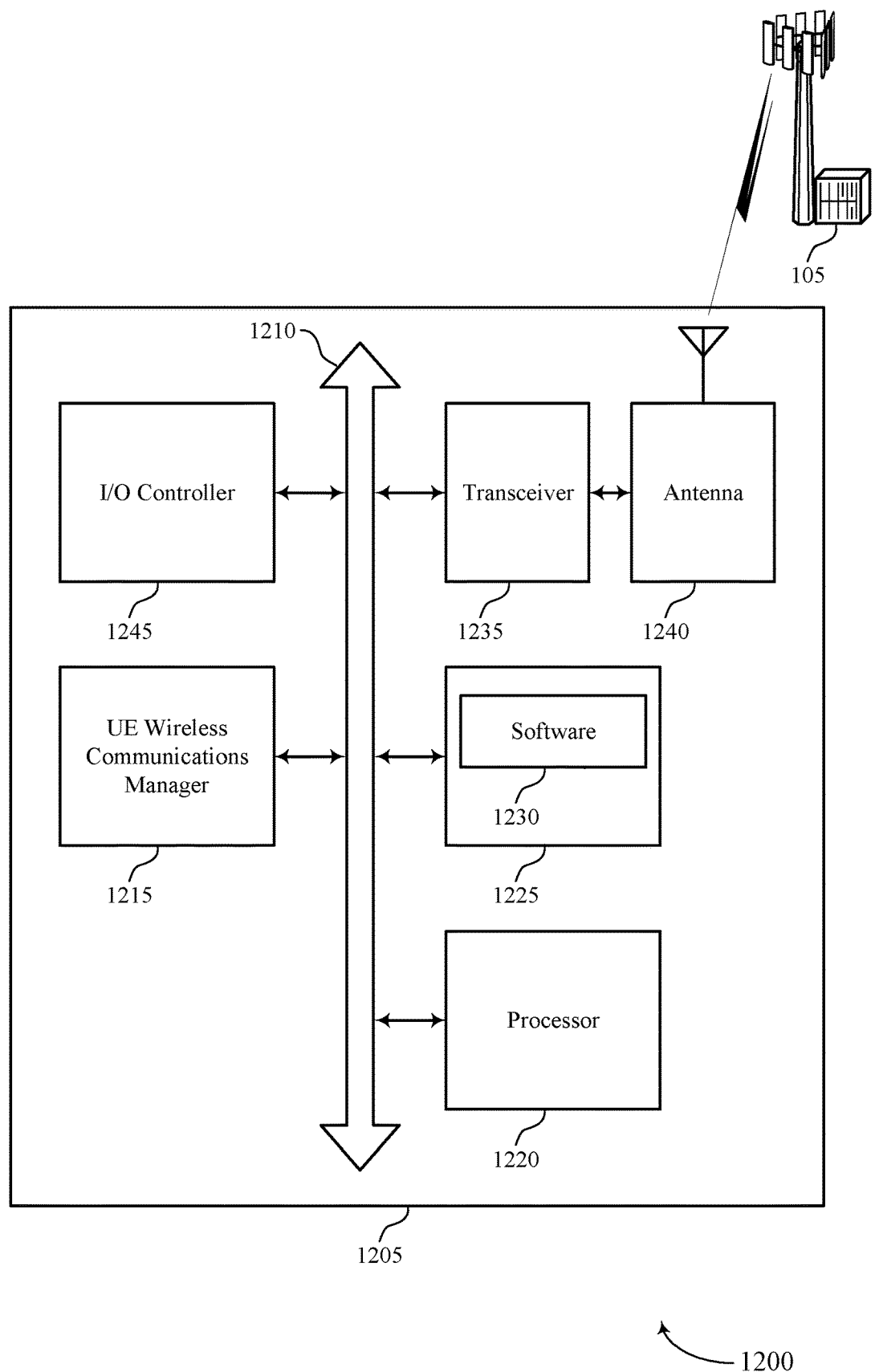
FIG. 12 illustrates a block diagram of a system including a UE that supports multiplexing code block group level and transport block level acknowledgments in accordance with aspects of the present disclosure.

FIG. 12 shows a diagram of a system 1200 including a device 1205 that supports multiplexing code block group level and transport block level acknowledgments in accordance with aspects of the present disclosure. Device 1205 may be an example of or include the components of wireless device 905, wireless device 1005, or a UE 115 as described herein, e.g., with reference to FIGS. 9 and 10. Device 1205 may include components for bi-directional voice and data communications including components for transmitting and receiving communications, including UE wireless communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting multiplexing code block group level and transport block level acknowledgments).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support multiplexing code block group level and transport block level acknowledgments. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
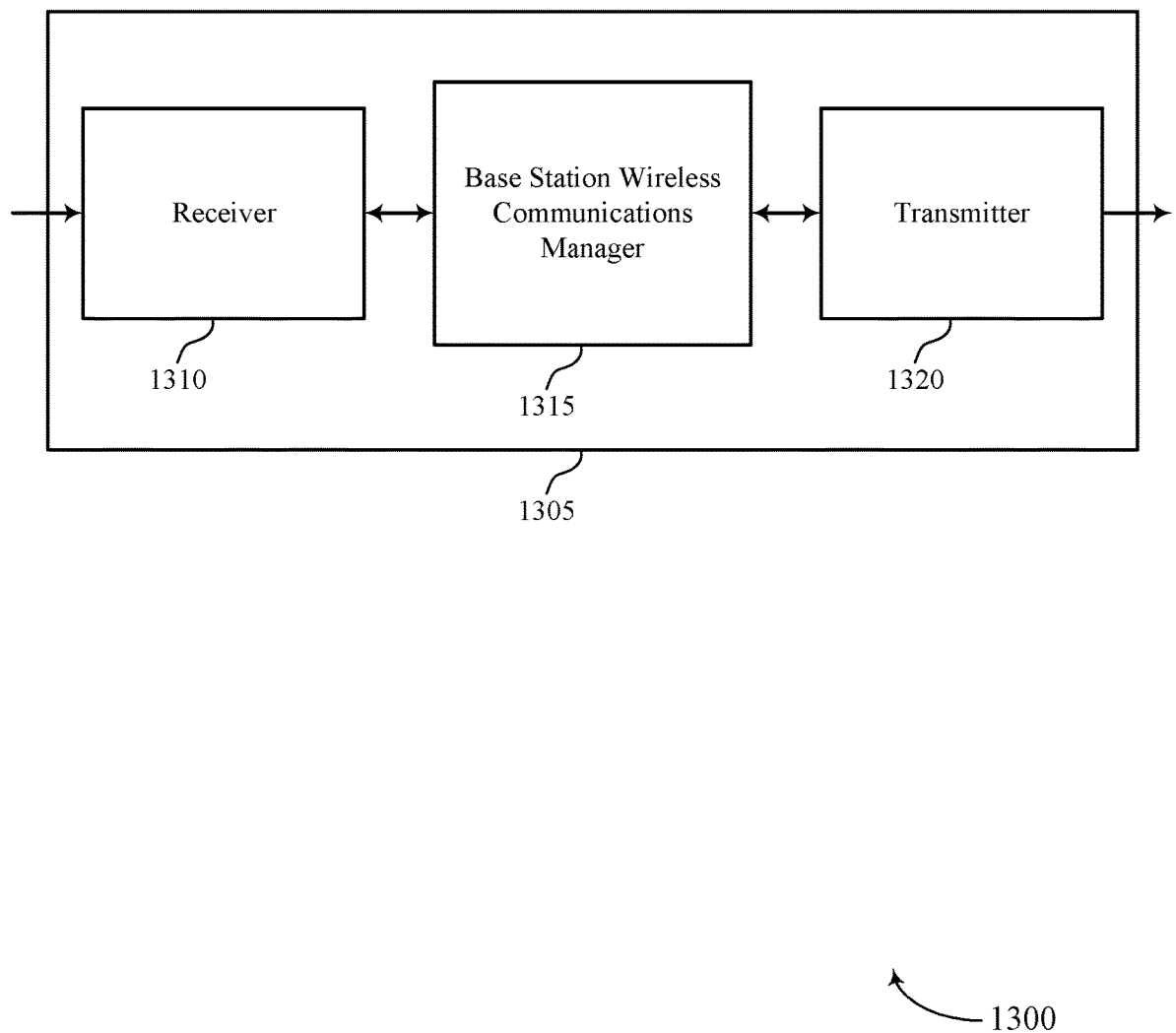
FIGS. 13 and 14 show block diagrams of a device that supports multiplexing code block group level and transport block level acknowledgments in accordance with aspects of the present disclosure.

FIG. 13 shows a block diagram 1300 of a wireless device 1305 that supports multiplexing code block group level and transport block level acknowledgments in accordance with aspects of the present disclosure. Wireless device 1305 may be an example of aspects of a base station 105 as described herein. Wireless device 1305 may include receiver 1310, base station wireless communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to multiplexing code block group level and transport block level acknowledgments, etc.).

Information may be passed on to other components of the device. The receiver 1310 may be an example of aspects of the transceiver 1635 described with reference to FIG. 16. The receiver 1310 may utilize a single antenna or a set of antennas.

Base station wireless communications manager 1315 and/or at least some of its various sub-components may be implemented in hardware, software executed by a processor, firmware, or any combination thereof. If implemented in software executed by a processor, the functions of the base station wireless communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station wireless communications manager 1315 and/or at least some of its various sub-components may be physically located at various positions, including being distributed such that portions of functions are implemented at different physical locations by one or more physical devices. In some examples, base station wireless communications manager 1315 and/or at least some of its various sub-components may be a separate and distinct component in accordance with various aspects of the present disclosure. In other examples, base station wireless communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure. Base station wireless communications manager 1315 may be an example of aspects of the base station wireless communications manager 1615 described with reference to FIG. 16.

Base station wireless communications manager 1315 may transmit a set of TBs, each of the TBs including one or more CBGs, receive a bit sequence providing CBG-level feedback on a first subset of TBs in the set of TBs and TB-level feedback on at least a second subset of TBs in the set of TBs, the first subset differing from the second subset, and retransmit at least one CBG for each TB in the first subset of TBs and the second subset of TBs based on the bit sequence. Although described in the context of operations performed by a base station 105, the operations and functions associated with the base station wireless communications manager 1315 may also be associated with a UE 115 (e.g., relating to multiplexed CBG-level and TB-level feedback received by a UE 115 in response to an uplink data transmission).

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
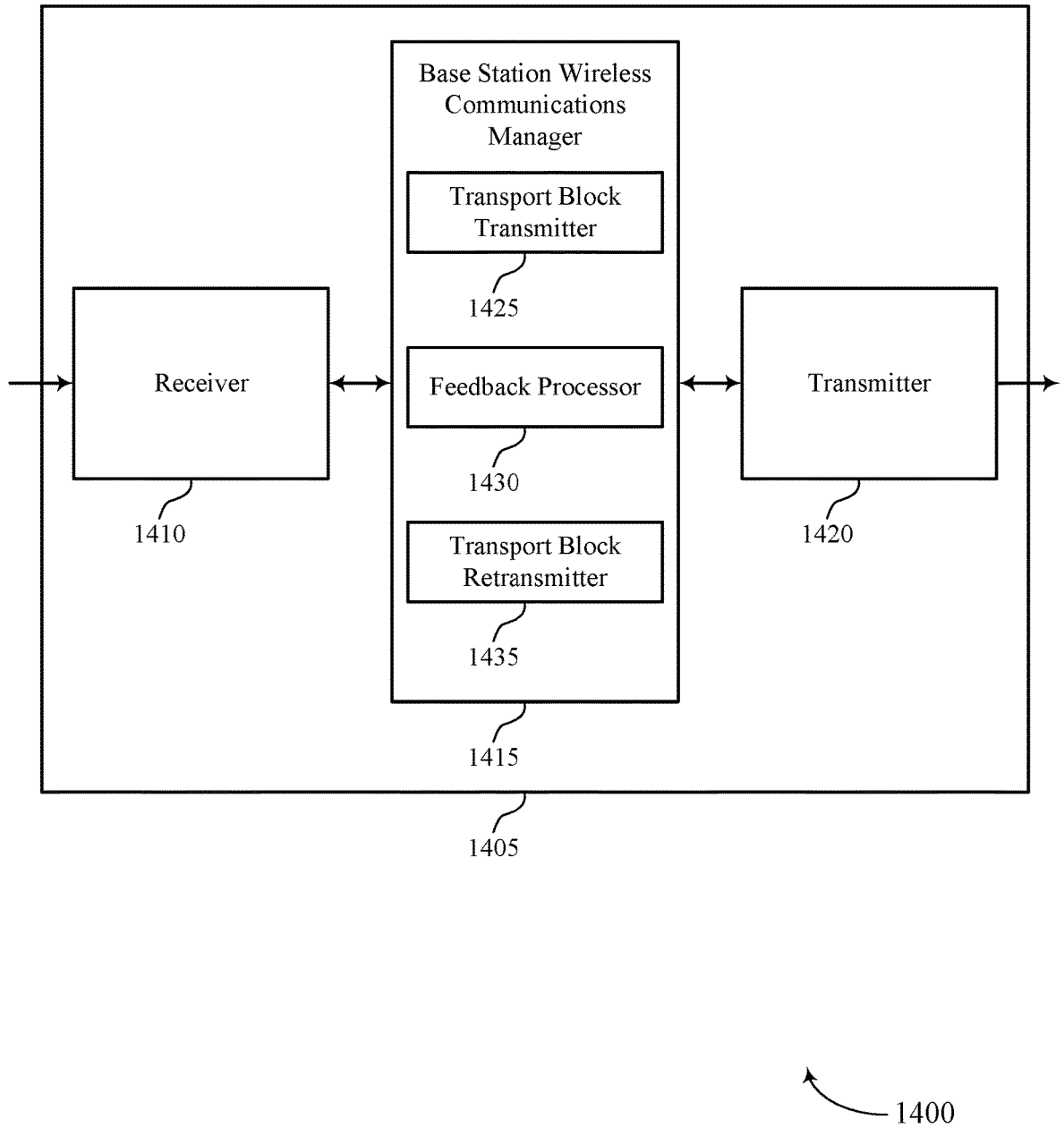

FIG. 14 shows a block diagram 1400 of a wireless device 1405 that supports multiplexing code block group level and transport block level acknowledgments in accordance with aspects of the present disclosure. Wireless device 1405 may be an example of aspects of a wireless device 1305 or a base station 105 as described with reference to FIG. 13. Wireless device 1405 may include receiver 1410, base station wireless communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to multiplexing code block group level and transport block level acknowledgments, etc.). Information may be passed on to other components of the device. The receiver 1410 may be an example of aspects of the transceiver 1635 described with reference to FIG. 16. The receiver 1410 may utilize a single antenna or a set of antennas.

Base station wireless communications manager 1415 may be an example of aspects of the base station wireless communications manager 1615 described with reference to FIG. 16. Base station wireless communications manager 1415 may also include transport block transmitter 1425, feedback processor 1430, and transport block retransmitter 1435. Although described in the context of operations performed by a base station 105, the operations and functions associated with the base station wireless communications manager 1415 may also be associated with a UE 115 (e.g., relating to multiplexed CBG-level and TB-level feedback received by a UE 115 in response to an uplink data transmission).

Transport block transmitter 1425 may transmit a set of TBs, each of the TBs including one or more CBGs. In some cases, a CBG includes at least one code block.

Feedback processor 1430 may receive a bit sequence providing CBG-level feedback on a first subset of TBs in the set of TBs and TB-level feedback on at least a second subset of TBs in the set of TBs, the first subset differing from the second subset. In some cases, a number of TBs in the first subset of TBs corresponds to a defined number of resources allocated for the CBG-level feedback. In some cases, the set of TBs are in an order, and where the first subset of TBs includes a defined number of TBs in the set of TBs at a beginning of the order, the defined number of TBs in the set of TBs at an ending of the order, or the defined number of TBs in the set of TBs after skipping a second defined number of TBs in the order that were not successfully received. In some cases, the TB-level feedback is associated with a set of feedback processes each having a feedback identifier associated with a respective TB in the set of TBs. In some examples (e.g., if a number of unsuccessfully received TBs in the set of TBs is below a threshold), the feedback processor 1430 may process the bit sequence to identify a predetermined sequence or to identify a parity sequence.

Transport block retransmitter 1435 may retransmit at least one CBG for each TB in the first subset of TBs and the second subset of TBs based on the bit sequence.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
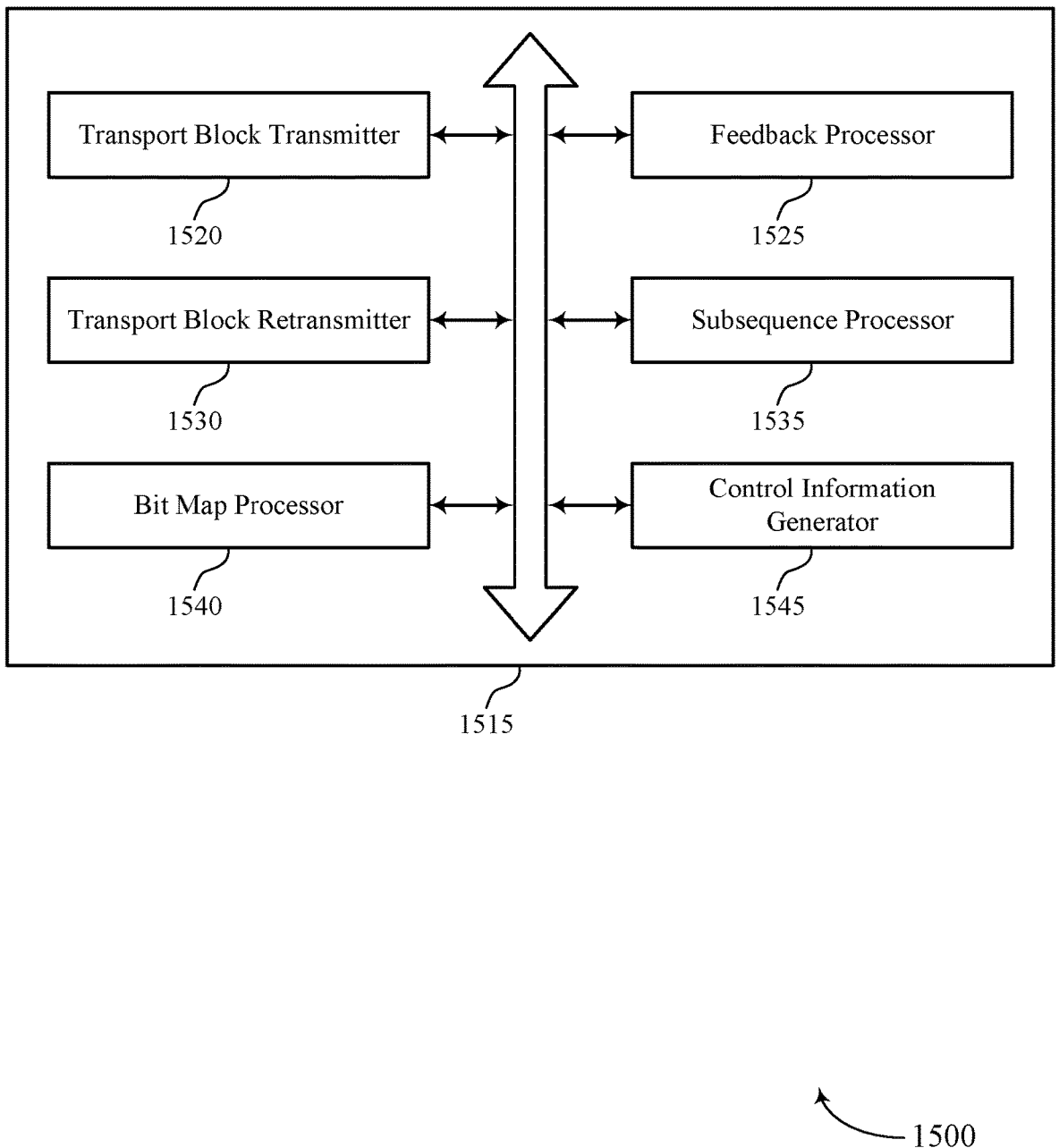
FIG. 15 shows a block diagram of a base station wireless communications manager that supports multiplexing code block group level and transport block level acknowledgments in accordance with aspects of the present disclosure.

FIG. 15 shows a block diagram 1500 of a base station wireless communications manager 1515 that supports multiplexing code block group level and transport block level acknowledgments in accordance with aspects of the present disclosure. The base station wireless communications manager 1515 may be an example of aspects of a base station wireless communications manager 1615 described with reference to FIGS. 13, 14, and 16. The base station wireless communications manager 1515 may include transport block transmitter 1520, feedback processor 1525, transport block retransmitter 1530, subsequence processor 1535, bit map processor 1540, and control information generator 1545. Each of these modules may communicate, directly or indirectly, with one another (e.g., via one or more buses). Although described in the context of operations performed by a base station 105, the operations and functions associated with the base station wireless communications manager 1515 may also be associated with a UE 115 (e.g., relating to multiplexed CBG-level and TB-level feedback received by a UE 115 in response to an uplink data transmission).

Transport block transmitter 1520 may transmit a set of TBs, each of the TBs including one or more CBGs. In some cases, a CBG includes at least one code block.

Feedback processor 1525 may receive a bit sequence providing CBG-level feedback on a first subset of TBs in the set of TBs and TB-level feedback on at least a second subset of TBs in the set of TBs, the first subset differing from the second subset. In some cases, a number of TBs in the first subset of TBs corresponds to a defined number of resources allocated for the CBG-level feedback. In some cases, the set of TBs are in an order, and where the first subset of TBs includes a defined number of TBs in the set of TBs at a beginning of the order, the defined number of TBs in the set of TBs at an ending of the order, or the defined number of TBs in the set of TBs after skipping a second defined number of TBs in the order that were not successfully received. In some cases, the TB-level feedback is associated with a set of feedback processes each having a feedback identifier associated with a respective TB in the set of TBs. In some examples (e.g., if a number of unsuccessfully received TBs in the set of TBs is below a threshold), the feedback processor 1525 may process the bit sequence to identify a predetermined sequence or to identify a parity sequence.

Transport block retransmitter 1530 may retransmit at least one CBG for each TB in the first subset of TBs and the second subset of TBs based on the bit sequence.

In some examples, subsequence processor 1535 may process the bit sequence to identify a first subsequence that provides the TB-level feedback on each TB in the set of TBs and a second subsequence that provides the CBG-level feedback on the first subset of TBs. In some examples, subsequence processor 1535 may generate an error detection decision based on processing a value for a parity check bit or parity sequence or predetermined sequence in the bit sequence that is based on the first subsequence, or the second subsequence, or both. In some examples, subsequence processor 1535 may process the bit sequence to identify a first subsequence that provides the TB-level feedback on each TB in the set of TBs, and a bit map in the bit sequence that identifies the first subset of TBs.

In some examples, subsequence processor 1535 may process the bit sequence to identify a first subsequence that provides the TB-level feedback on each TB in the set of TBs and an index in the bit sequence that identifies the first subset of TBs. In some examples, subsequence processor 1535 may process based on the bit map, a subsequence in the bit sequence to identify the CBG-level feedback for the first subset of TBs and the TB-level feedback for the second subset of TBs. In some examples, subsequence processor 1535 may process a second subsequence of the bit sequence to identify the CBG-level feedback for the first subset of TBs in accordance with the indication of the first subsequence of whether the CBG-level feedback is being provided for the respective TB.

In some examples, subsequence processor 1535 may process a value for each 2 bits in a first subsequence of the bit sequence identifying whether a respective TB in the set of TBs was successfully received, or whether a control channel was successfully received, or whether CBG-level feedback is being provided for the respective TB. In some examples, subsequence processor 1535 may process the bit sequence to identify a first subsequence that provides the TB-level feedback on each TB in the set of TBs, a second subsequence that identifies the first subset of TBs on which the bit sequence includes the CBG-level feedback, and a third subsequence that provides the CBG-level feedback on the first subset of TBs. In some examples, subsequence processor 1535 may determine a format for the second subsequence based on one or more of a number of bits in the bit sequence, or a number of TBs in the set of TBs, or a number of TBs in the set of TBs that were not successfully received, or a CBG size, or any combination thereof. In some cases, the index has a fixed bit width.

Bit map processor 1540 may process a bit map in the bit sequence to identify that the first subset of TBs includes the CBG-level feedback and that the second subset of TBs includes the TB-level feedback.

Control information generator 1545 may transmit control information indicating to provide the CBG-level feedback on the first subset of TBs and the TB-level feedback on the second subset of TBs.

Figure 16:
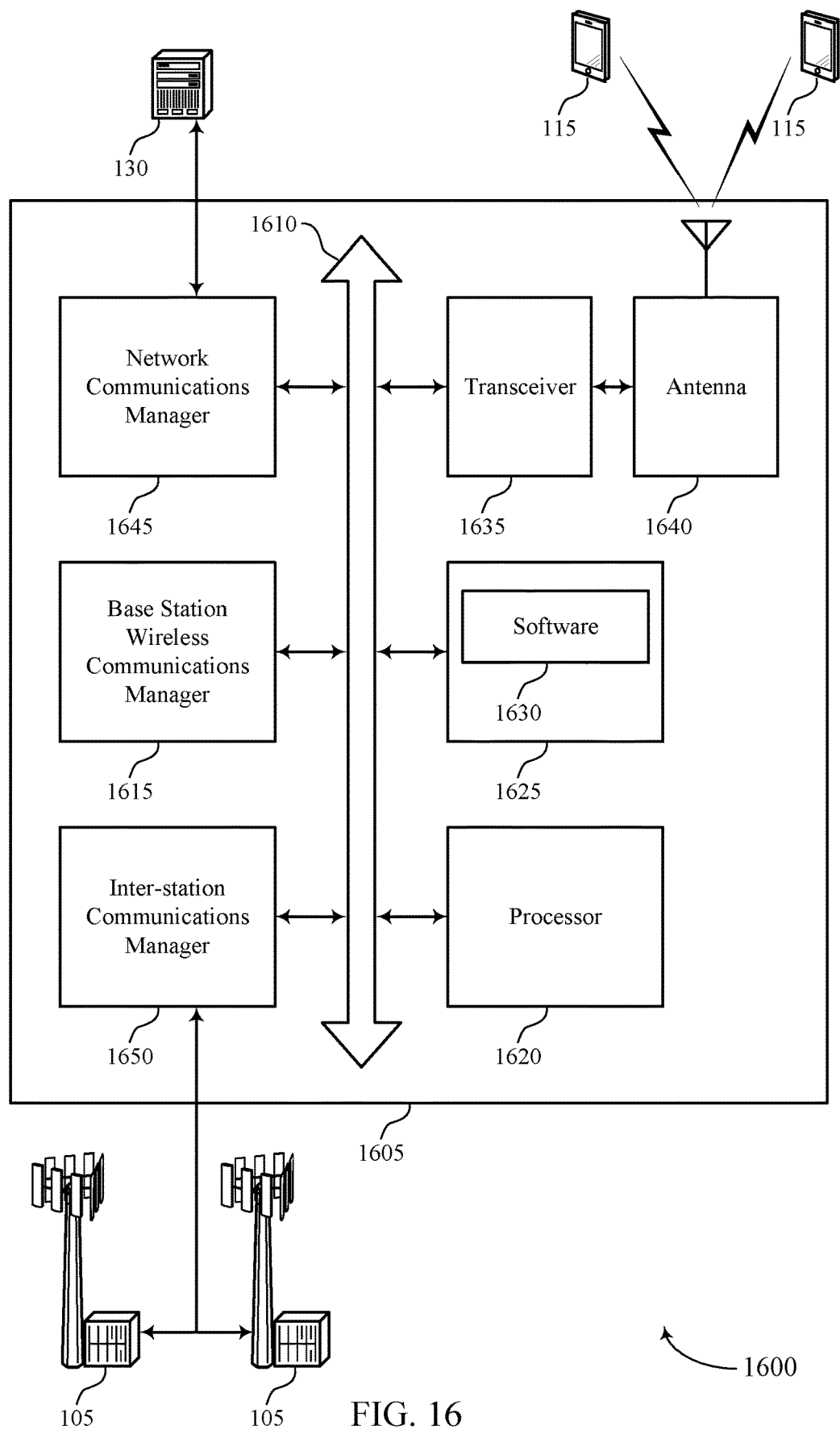
FIG. 16 illustrates a block diagram of a system including a base station that supports multiplexing code block group level and transport block level acknowledgments in accordance with aspects of the present disclosure.

FIG. 16 shows a diagram of a system 1600 including a device 1605 that supports multiplexing code block group level and transport block level acknowledgments in accordance with aspects of the present disclosure. Device 1605 may be an example of or include the components of base station 105 as described herein, e.g., with reference to FIG. 1. Device 1605 may include components for bi-directional voice and data communications including components for transmitting and receiving communications, including base station wireless communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting multiplexing code block group level and transport block level acknowledgments).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support multiplexing code block group level and transport block level acknowledgments. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described herein. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an LTE/LTE-A wireless communication network technology to provide communication between base stations 105.

Figure 17:
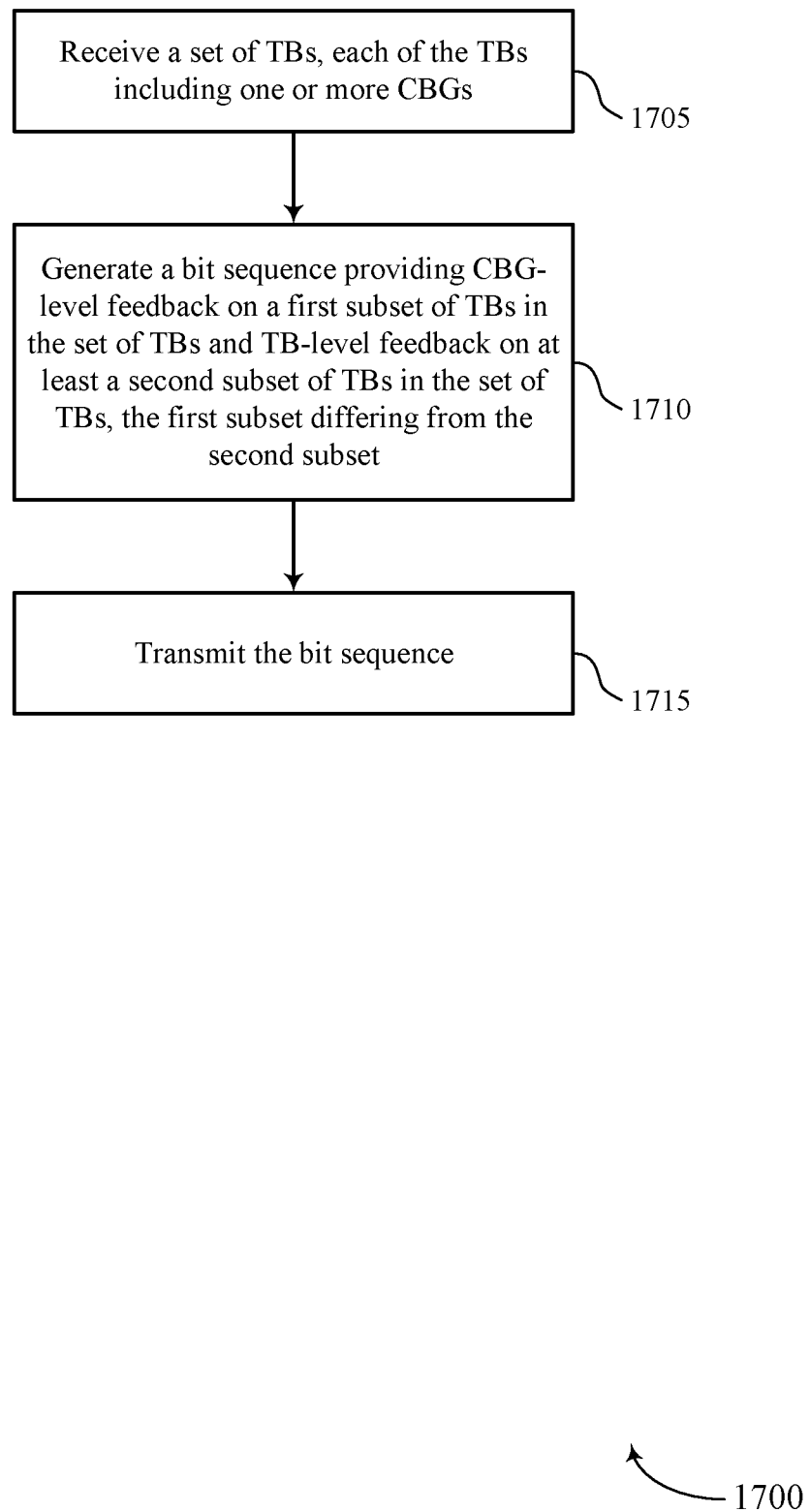
FIGS. 17 through 22 illustrate methods for multiplexing code block group level and transport block level acknowledgments in accordance with aspects of the present disclosure.

FIG. 17 shows a flowchart illustrating a method 1700 for multiplexing code block group level and transport block level acknowledgments in accordance with aspects of the present disclosure. The operations of method 1700 may be implemented by a UE 115 or a base station 105 or their components as described herein, and is described below as being implemented by a UE 115. For example, the operations of method 1700 may be performed by a UE wireless communications manager as described with reference to FIGS. 9 through 12. In some examples, a UE 115 may execute a set of codes to control the functional elements of the device to perform the described functions. Additionally or alternatively, the UE 115 may perform aspects of the described functions using special-purpose hardware.

At block 1705 the UE 115 may receive a set of TBs, each of the TBs comprising one or more CBGs. The operations of block 1705 may be performed according to the methods described herein. In certain examples, aspects of the operations of block 1705 may be performed by a transport block receiver as described with reference to FIGS. 9 through 12.

At block 1710 the UE 115 may generate a bit sequence providing CBG-level feedback on a first subset of TBs in the set of TBs and TB-level feedback on at least a second subset of TBs in the set of TBs, the first subset differing from the second subset. The operations of block 1710 may be performed according to the methods described herein. In certain examples, aspects of the operations of block 1710 may be performed by a feedback generator as described with reference to FIGS. 9 through 12.

At block 1715 the UE 115 may transmit the bit sequence. The operations of block 1715 may be performed according to the methods described herein. In certain examples, aspects of the operations of block 1715 may be performed by a feedback transmitter as described with reference to FIGS. 9 through 12.

Figure 18:
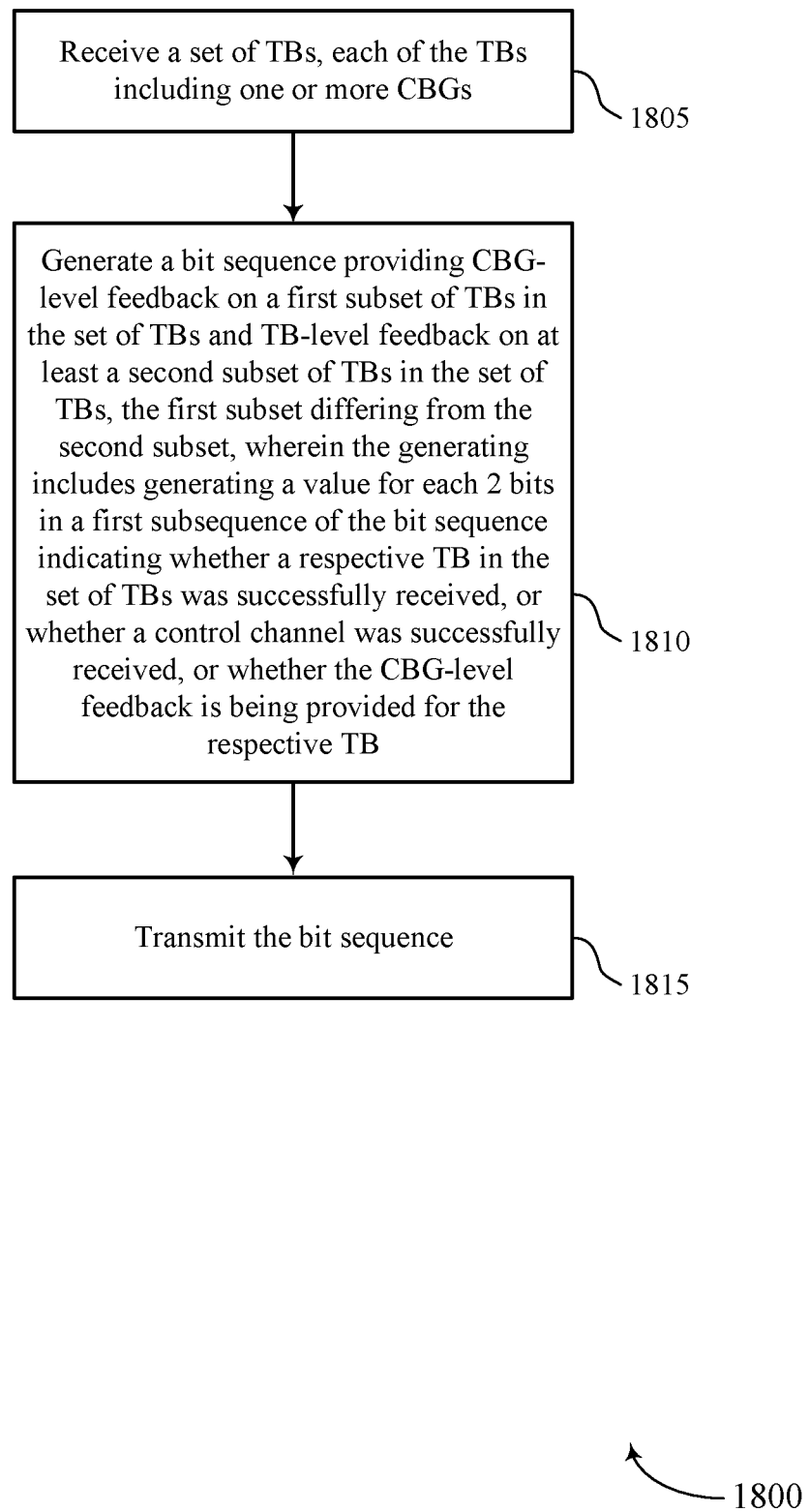

FIG. 18 shows a flowchart illustrating a method 1800 for multiplexing code block group level and transport block level acknowledgments in accordance with aspects of the present disclosure. The operations of method 1800 may be implemented by a UE 115 or a base station 105 or their components as described herein, and is described below as being implemented by a UE 115. For example, the operations of method 1800 may be performed by a UE wireless communications manager as described with reference to FIGS. 9 through 12. In some examples, a UE 115 may execute a set of codes to control the functional elements of the device to perform the described functions. Additionally or alternatively, the UE 115 may perform aspects of the described functions using special-purpose hardware.

At block 1805 the UE 115 may receive a set of TBs, each of the TBs comprising one or more CBGs. The operations of block 1805 may be performed according to the methods described herein. In certain examples, aspects of the operations of block 1805 may be performed by a transport block receiver as described with reference to FIGS. 9 through 12.

At block 1810 the UE 115 may generate a bit sequence providing CBG-level feedback on a first subset of TBs in the set of TBs and TB-level feedback on at least a second subset of TBs in the set of TBs, the first subset differing from the second subset, wherein the generating includes generating a value for each 2 bits in a first subsequence of the bit sequence indicating whether a respective TB in the set of TBs was successfully received, or whether a control channel was successfully received, or whether the CBG-level feedback is being provided for the respective TB. In some cases, generating the bit sequence includes generating a second subsequence of the bit sequence that provides the CBG-level feedback for the first subset of TBs in accordance with the indication of the first subsequence of whether the CBG-level feedback is being provided for the respective TB. The operations of block 1810 may be performed according to the methods described herein. In certain examples, aspects of the operations of block 1810 may be performed by a feedback generator as described with reference to FIGS. 9 through 12.

At block 1815 the UE 115 may transmit the bit sequence. The operations of block 1815 may be performed according to the methods described herein. In certain examples, aspects of the operations of block 1815 may be performed by a feedback transmitter as described with reference to FIGS. 9 through 12.

Figure 19:
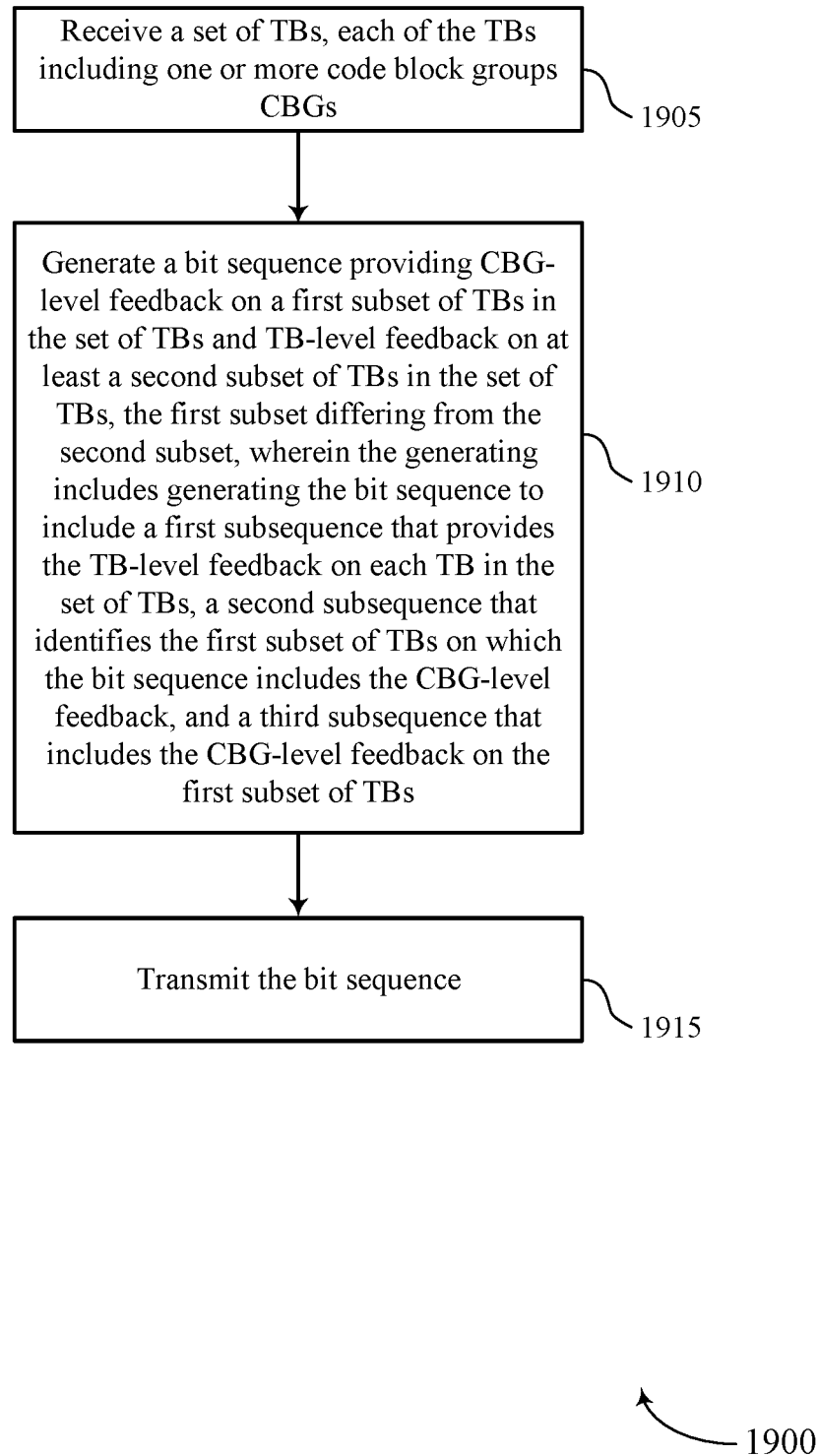

FIG. 19 shows a flowchart illustrating a method 1900 for multiplexing code block group level and transport block level acknowledgments in accordance with aspects of the present disclosure. The operations of method 1900 may be implemented by a UE 115 or a base station 105 or their components as described herein, and is described below as being implemented by a UE 115. For example, the operations of method 1900 may be performed by a UE wireless communications manager as described with reference to FIGS. 9 through 12. In some examples, a UE 115 may execute a set of codes to control the functional elements of the device to perform the described functions. Additionally or alternatively, the UE 115 may perform aspects of the described functions using special-purpose hardware.

At block 1905 the UE 115 may receive a set of TBs, each of the TBs comprising one or more CBGs. The operations of block 1905 may be performed according to the methods described herein. In certain examples, aspects of the operations of block 1905 may be performed by a transport block receiver as described with reference to FIGS. 9 through 12.

At block 1910 the UE 115 may generate a bit sequence providing CBG-level feedback on a first subset of TBs in the set of TBs and TB-level feedback on at least a second subset of TBs in the set of TBs, the first subset differing from the second subset, wherein the generating comprises generating the bit sequence to include a first subsequence that provides the TB-level feedback on each TB in the set of TBs, a second subsequence that identifies the first subset of TBs on which the bit sequence includes the CBG-level feedback, and a third subsequence that includes the CBG-level feedback on the first subset of TBs. In some examples the UE 115 may select a format for the second subsequence based at least in part on one or more of a number of bits in the bit sequence, or a number of TBs in the set of TBs, or a number of TBs in the set of TBs that were not successfully received, or a CBG size, or any combination thereof. The operations of block 1910 may be performed according to the methods described herein. In certain examples, aspects of the operations of block 1910 may be performed by a feedback generator as described with reference to FIGS. 9 through 12.

At block 1915 the UE 115 may transmit the bit sequence. The operations of block 1915 may be performed according to the methods described herein. In certain examples, aspects of the operations of block 1915 may be performed by a feedback transmitter as described with reference to FIGS. 9 through 12.

Figure 20:
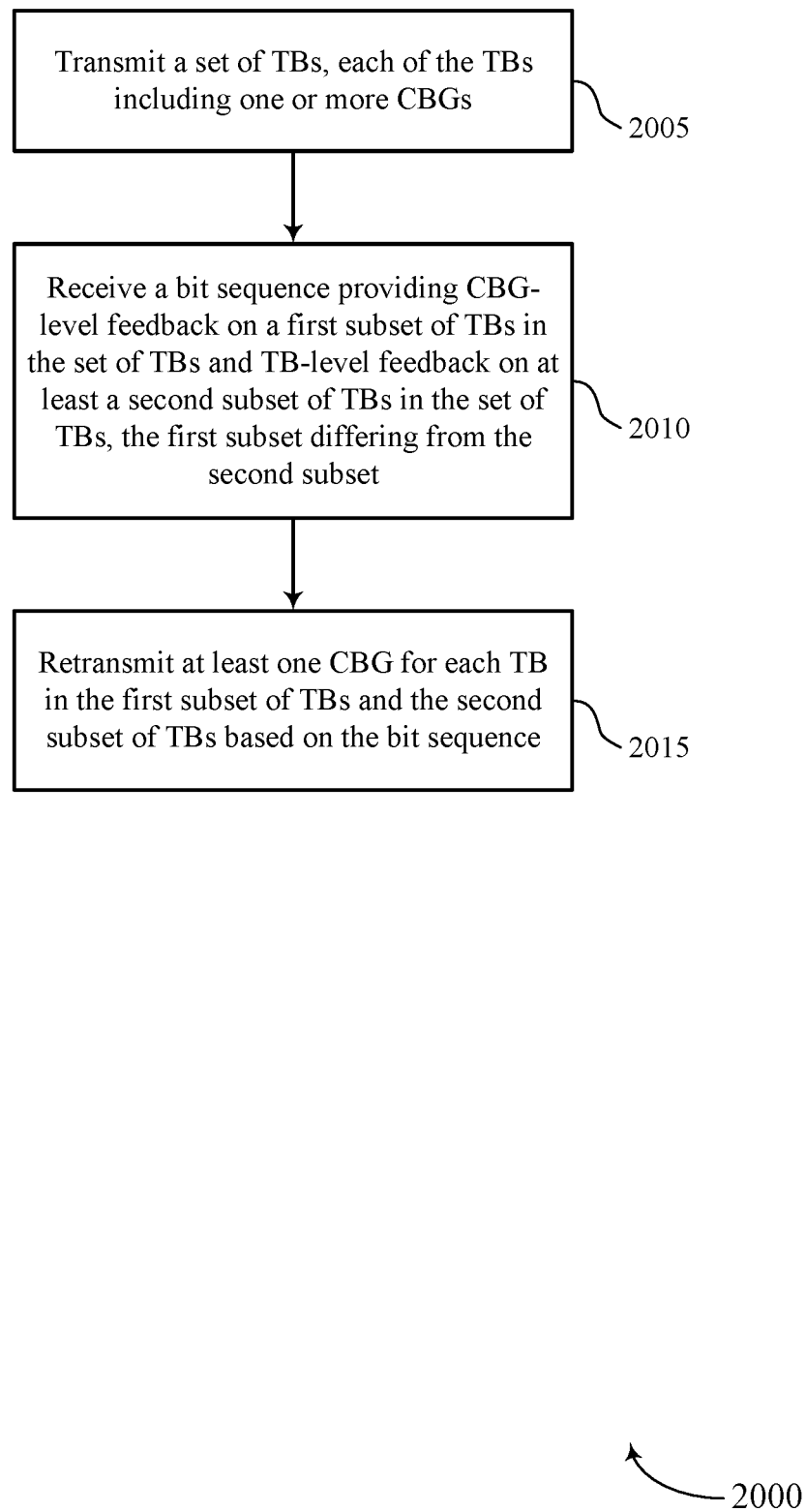

FIG. 20 shows a flowchart illustrating a method 2000 for multiplexing code block group level and transport block level acknowledgments in accordance with aspects of the present disclosure. The operations of method 2000 may be implemented by a base station 105 or a UE 115 or their components as described herein, and is described below as being implemented by a base station 105. For example, the operations of method 2000 may be performed by a base station wireless communications manager as described with reference to FIGS. 13 through 16. In some examples, a base station 105 may execute a set of codes to control the functional elements of the device to perform the described functions. Additionally or alternatively, the base station 105 may perform aspects of the described functions using special-purpose hardware.

At block 2005 the base station 105 may transmit a set of TBs, each of the TBs comprising one or more CBGs. The operations of block 2005 may be performed according to the methods described herein. In certain examples, aspects of the operations of block 2005 may be performed by a transport block transmitter as described with reference to FIGS. 13 through 16.

At block 2010 the base station 105 may receive a bit sequence providing CBG-level feedback on a first subset of TBs in the set of TBs and TB-level feedback on at least a second subset of TBs in the set of TBs, the first subset differing from the second subset. The operations of block 2010 may be performed according to the methods described herein. In certain examples, aspects of the operations of block 2010 may be performed by a feedback processor as described with reference to FIGS. 13 through 16.

At block 2015 the base station 105 may retransmit at least one CBG for each TB in the first subset of TBs and the second subset of TBs based at least in part on the bit sequence. The operations of block 2015 may be performed according to the methods described herein. In certain examples, aspects of the operations of block 2015 may be performed by a transport block retransmitter as described with reference to FIGS. 13 through 16.

Figure 21:
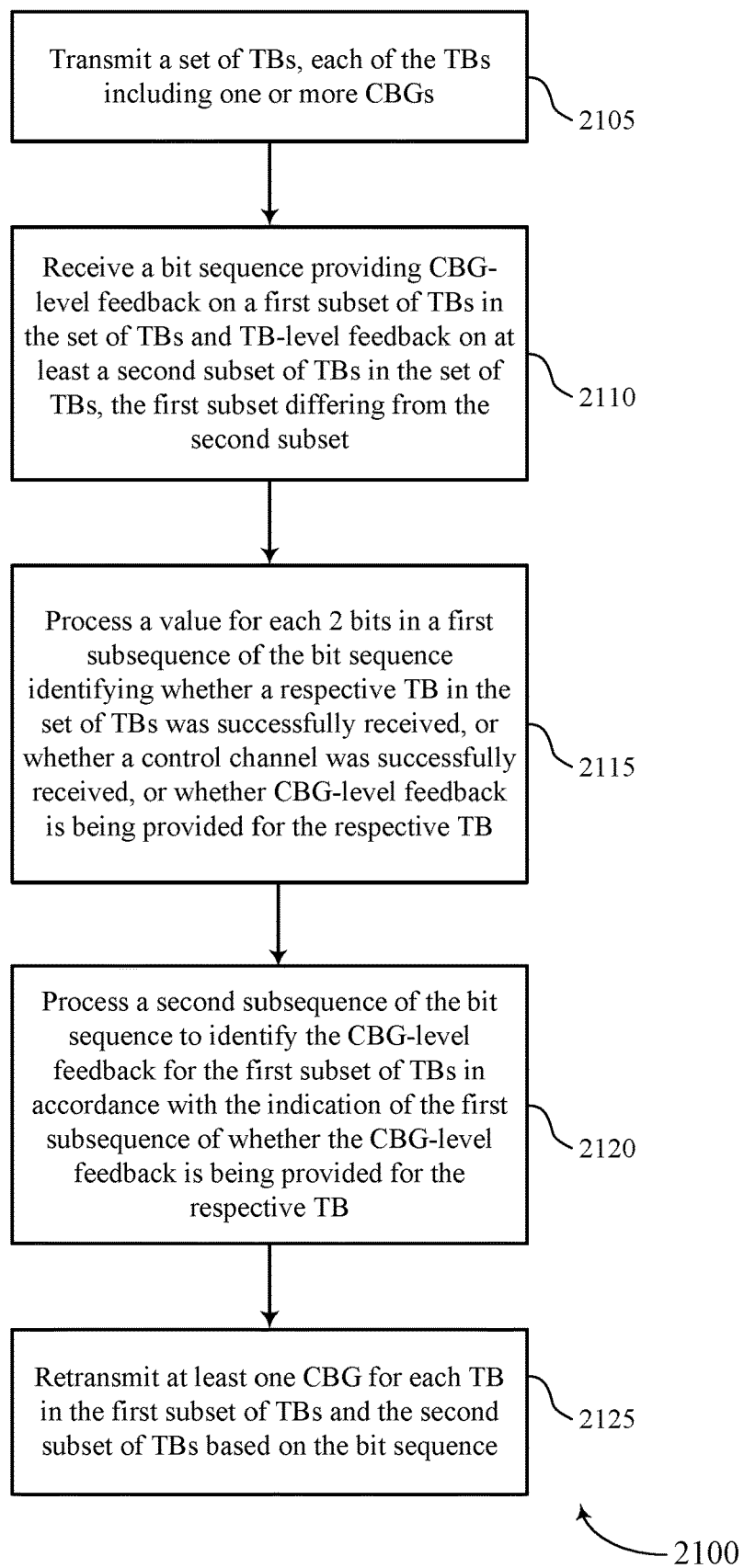

FIG. 21 shows a flowchart illustrating a method 2100 for multiplexing code block group level and transport block level acknowledgments in accordance with aspects of the present disclosure. The operations of method 2100 may be implemented by a base station 105 or a UE 115 or their components as described herein, and is described below as being implemented by a base station 105. For example, the operations of method 2100 may be performed by a base station wireless communications manager as described with reference to FIGS. 13 through 16. In some examples, a base station 105 may execute a set of codes to control the functional elements of the device to perform the described functions. Additionally or alternatively, the base station 105 may perform aspects of the described functions using special-purpose hardware.

At block 2105 the base station 105 may transmit a set of TBs, each of the TBs comprising one or more CBGs. The operations of block 2105 may be performed according to the methods described herein. In certain examples, aspects of the operations of block 2105 may be performed by a transport block transmitter as described with reference to FIGS. 13 through 16.

At block 2110 the base station 105 may receive a bit sequence providing CBG-level feedback on a first subset of TBs in the set of TBs and TB-level feedback on at least a second subset of TBs in the set of TBs, the first subset differing from the second subset. The operations of block 2110 may be performed according to the methods described herein. In certain examples, aspects of the operations of block 2110 may be performed by a feedback processor as described with reference to FIGS. 13 through 16.

At block 2115 the base station 105 may process a value for each 2 bits in a first subsequence of the bit sequence identifying whether a respective TB in the set of TBs was successfully received, or whether a control channel was successfully received, or whether CBG-level feedback is being provided for the respective TB. The operations of block 2115 may be performed according to the methods described herein. In certain examples, aspects of the operations of block 2115 may be performed by a subsequence processor as described with reference to FIGS. 13 through 16.

At block 2120 the base station 105 may process a second subsequence of the bit sequence to identify the CBG-level feedback for the first subset of TBs in accordance with the indication of the first subsequence of whether the CBG-level feedback is being provided for the respective TB. The operations of block 2120 may be performed according to the methods described herein. In certain examples, aspects of the operations of block 2120 may be performed by a subsequence processor as described with reference to FIGS. 13 through 16.

At block 2125 the base station 105 may retransmit at least one CBG for each TB in the first subset of TBs and the second subset of TBs based at least in part on the bit sequence. The operations of block 2125 may be performed according to the methods described herein. In certain examples, aspects of the operations of block 2125 may be performed by a transport block retransmitter as described with reference to FIGS. 13 through 16.

Figure 22:
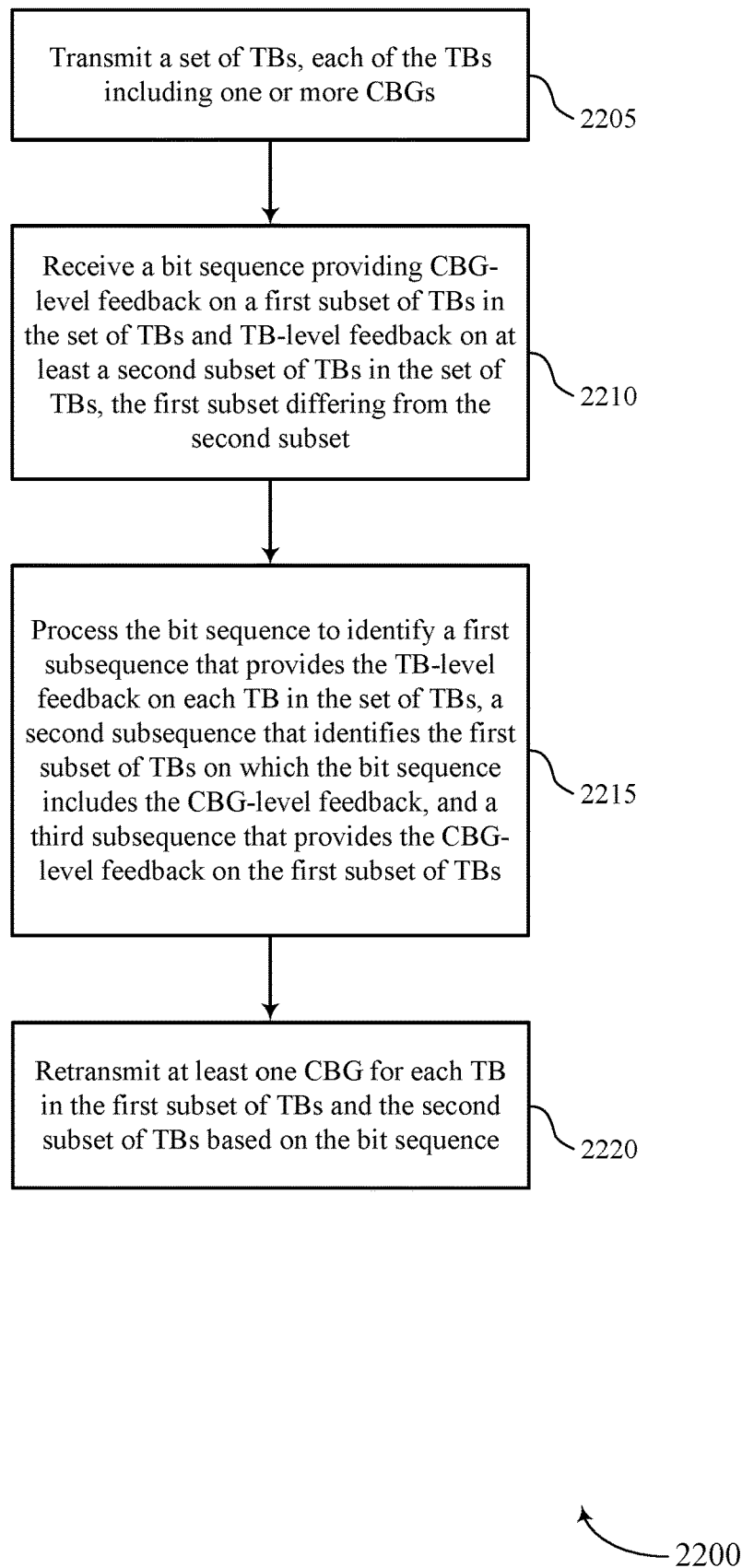

FIG. 22 shows a flowchart illustrating a method 2200 for multiplexing code block group level and transport block level acknowledgments in accordance with aspects of the present disclosure. The operations of method 2200 may be implemented by a base station 105 or a UE 115 or their components as described herein, and is described below as being implemented by a base station 105. For example, the operations of method 2200 may be performed by a base station wireless communications manager as described with reference to FIGS. 13 through 16. In some examples, a base station 105 may execute a set of codes to control the functional elements of the device to perform the described functions. Additionally or alternatively, the base station 105 may perform aspects of the described functions using special-purpose hardware.

At block 2205 the base station 105 may transmit a set of TBs, each of the TBs comprising one or more CBGs. The operations of block 2205 may be performed according to the methods described herein. In certain examples, aspects of the operations of block 2205 may be performed by a transport block transmitter as described with reference to FIGS. 13 through 16.

At block 2210 the base station 105 may receive a bit sequence providing CBG-level feedback on a first subset of TBs in the set of TBs and TB-level feedback on at least a second subset of TBs in the set of TBs, the first subset differing from the second subset. The operations of block 2210 may be performed according to the methods described herein. In certain examples, aspects of the operations of block 2210 may be performed by a feedback processor as described with reference to FIGS. 13 through 16.

At block 2215 the base station 105 may process the bit sequence to identify a first subsequence that provides the TB-level feedback on each TB in the set of TBs, a second subsequence that identifies the first subset of TBs on which the bit sequence includes the CBG-level feedback, and a third subsequence that provides the CBG-level feedback on the first subset of TBs. In some examples the base station 105 may determine a format for the second subsequence based at least in part on one or more of a number of bits in the bit sequence, or a number of TBs in the set of TBs, or a number of TBs in the set of TBs that were not successfully received, or a CBG size, or any combination thereof. The operations of block 2215 may be performed according to the methods described herein. In certain examples, aspects of the operations of block 2215 may be performed by a subsequence processor as described with reference to FIGS. 13 through 16.

At block 2220 the base station 105 may retransmit at least one CBG for each TB in the first subset of TBs and the second subset of TBs based at least in part on the bit sequence. The operations of block 2220 may be performed according to the methods described herein. In certain examples, aspects of the operations of block 2220 may be performed by a transport block retransmitter as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving control information indicating a configuration to provide code block group (CBG)-level hybrid automatic repeat request (HARQ) acknowledgment feedback for a plurality of HARQ identifiers (IDs);
receiving a plurality of transport blocks (TBs), each TB of the plurality of TBs associated with a respective one of the plurality of HARQ IDs and comprising one or more CBGs;
generating, based at least in part on the control information, a bit sequence providing CBG-level HARQ acknowledgment feedback for the plurality of HARQ IDs, wherein the bit sequence comprises a respective HARQ acknowledgment feedback bit for each of the CBGs of each TB for the plurality of HARQ IDs; and
transmitting the bit sequence.

2. The method of claim 1, wherein transmitting the bit sequence comprises:
transmitting the bit sequence in a single subframe.

3. The method of claim 2, further comprising:
performing a listen-before-talk procedure associated with an unlicensed radio frequency spectrum band, wherein transmitting the bit sequence comprises transmitting the bit sequence in the single subframe using resources of the unlicensed radio frequency spectrum band based at least in part on performing the listen-before-talk procedure.

4. The method of claim 1, further comprising:
establishing a connection with a base station, wherein receiving the control information comprises receiving the control information from the base station based at least in part on establishing the connection; and
selecting a physical uplink control channel for transmission of the bit sequence based at least in part on establishing the connection.

5. The method of claim 4, wherein receiving the control information comprises:
  receiving a radio resource control configuration comprising the control information as part of establishing the connection with the base station.

6. The method of claim 1, wherein receiving the control information comprises:
  receiving a dynamic feedback configuration that is associated with the plurality of HARQ IDs.

7. A method for wireless communication, comprising:
  transmitting control information indicating a configuration to provide code block group (CBG)-level hybrid automatic repeat request (HARQ) acknowledgment feedback for a plurality of HARQ identifiers (IDs);
  transmitting a plurality of transport blocks (TBs), each TB of the plurality of TBs associated with a respective one of the plurality of HARQ IDs and comprising one or more CBGs; and
  receiving, based at least in part on the control information, a bit sequence providing CBG-level HARQ acknowledgment feedback for the plurality of HARQ IDs, wherein the bit sequence comprises a respective HARQ acknowledgment feedback bit for each of the CBGs of each TB for the plurality of HARQ IDs.

8. The method of claim 7, wherein receiving the bit sequence comprises:
  receiving the bit sequence in a single subframe.

9. The method of claim 7, further comprising:
  establishing a connection with a UE, wherein transmitting the control information comprises transmitting the control information to the UE based at least in part on establishing the connection.

10. The method of claim 9, wherein transmitting the control information comprises:
  transmitting a radio resource control configuration comprising the control information as part of establishing the connection with the UE.

11. The method of claim 7, wherein transmitting the control information comprises:
  transmitting a dynamic feedback configuration that is associated with the plurality of HARQ IDs.

12. An apparatus for wireless communication, comprising:
  a receiver;
  a transmitter;
  a processor;
  memory coupled with the processor; and
  instructions stored in the memory and operable, when executed by the processor, to cause the apparatus to:
    receive, via the receiver, control information indicating a configuration to provide code block group (CBG)-level hybrid automatic repeat request (HARQ) acknowledgment feedback for a plurality of HARQ identifiers (IDs);
    receive, via the receiver, a plurality of transport blocks (TBs), each TB of the plurality of TBs associated with a respective one of the plurality of HARQ IDs and comprising one or more CBGs;
    generate, based at least in part on the control information, a bit sequence providing CBG-level HARQ acknowledgment feedback for the plurality of HARQ IDs, wherein the bit sequence comprises a respective HARQ acknowledgment feedback bit for each of the CBGs of each TB for the plurality of HARQ IDs; and
    transmit, via the transmitter, the bit sequence.

13. The apparatus of claim 12, wherein the instructions to transmit the bit sequence are operable, when executed by the processor, to cause the apparatus to:
  transmit the bit sequence in a single subframe.

14. The apparatus of claim 13, wherein the instructions are further operable, when executed by the processor, to cause the apparatus to:
  perform a listen-before-talk procedure associated with an unlicensed radio frequency spectrum band, wherein the instructions to transmit the bit sequence are operable, when executed by the processor, to cause the apparatus to transmit the bit sequence in the single subframe using resources of the unlicensed radio frequency spectrum band based at least in part on performing the listen-before-talk procedure.

15. The apparatus of claim 12, wherein the instructions are further operable, when executed by the processor, to cause the apparatus to:
  establish a connection with a base station, wherein the instructions to receive the control information are operable, when executed by the processor, to cause the apparatus to receive the control information from the base station based at least in part on establishing the connection; and
  selecting a physical uplink control channel for transmission of the bit sequence based at least in part on establishing the connection.

16. The apparatus of claim 15, wherein the instructions to receive the control information are operable, when executed by the processor, to cause the apparatus to:
  receive a radio resource control configuration comprising the control information as part of establishing the connection with the base station.

17. The apparatus of claim 12, wherein the instructions to receive the control information are operable, when executed by the processor, to cause the apparatus to:
  receive a dynamic feedback configuration that is associated with the plurality of HARQ IDs.

18. An apparatus for wireless communication, comprising:
  a transmitter;
  a receiver;
  a processor;
  memory coupled with the processor; and
  instructions stored in the memory and operable, when executed by the processor, to cause the apparatus to:
    transmit, via the transmitter, control information indicating a configuration to provide code block group (CBG)-level hybrid automatic repeat request (HARQ) acknowledgment feedback for a plurality of HARQ identifiers (IDs);
    transmit, via the transmitter, a plurality of transport blocks (TBs), each TB of the plurality of TBs associated with a respective one of the plurality of HARQ IDs and comprising one or more CBGs;
    receive, via the receiver and based at least in part on the control information, a bit sequence providing CBG-level feedback for the plurality of HARQ IDs, wherein the bit sequence comprises a respective HARQ acknowledgment feedback bit for each of the CBGs of each TB for the plurality of HARQ IDs.

19. The apparatus of claim 18, wherein the instructions to receive the bit sequence are operable, when executed by the processor, to cause the apparatus to:
  receive the bit sequence in a single subframe.

20. The apparatus of claim 18, wherein the instructions are further operable, when executed by the processor, to cause the apparatus to:
  establish a connection with a UE, wherein the instructions to transmit the control information are operable, when executed by the processor, to cause the apparatus to transmit the control information to the UE based at least in part on establishing the connection.

21. The apparatus of claim 20, wherein the instructions to transmit the control information are operable, when executed by the processor, to cause the apparatus to:
  transmit a radio resource control configuration comprising the control information as part of establishing the connection with the UE.

22. The apparatus of claim 18, wherein the instructions to transmit the control information are operable, when executed by the processor, to cause the apparatus to:
  transmit a dynamic feedback configuration that is associated with the plurality of HARQ IDs.

\* \* \* \* \*